US011600265B2

(12) United States Patent
Lin et al.

(10) Patent No.: US 11,600,265 B2
(45) Date of Patent: Mar. 7, 2023

(54) SYSTEMS AND METHODS FOR DETERMINING WHETHER TO TRIGGER A VOICE CAPABLE DEVICE BASED ON SPEAKING CADENCE

(71) Applicant: Rovi Guides, Inc., San Jose, CA (US)

(72) Inventors: Edison Lin, Los Altos Hills, CA (US); Rowena Young, Menlo Park, CA (US); Kanchan Sripathy, San Jose, CA (US); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 188 days.

(21) Appl. No.: 17/089,357

(22) Filed: Nov. 4, 2020

(65) Prior Publication Data

US 2021/0125604 A1 Apr. 29, 2021

Related U.S. Application Data

(63) Continuation of application No. 16/139,453, filed on Sep. 24, 2018, now Pat. No. 10,861,444.

(51) Int. Cl.
*G10L 15/22* (2006.01)
*G10L 15/18* (2013.01)
*G10L 15/08* (2006.01)

(52) U.S. Cl.
CPC .......... *G10L 15/1807* (2013.01); *G10L 15/22* (2013.01); *G10L 2015/088* (2013.01); *G10L 2015/223* (2013.01)

(58) Field of Classification Search
CPC ........ G10L 15/22; G10L 15/00; G10L 15/01; G10L 15/04; G10L 15/05; G10L 15/06; G10L 15/065; G10L 15/07; G10L 15/08; G10L 15/18; G10L 15/1807; G10L 15/20; G10L 15/26; G10L 2015/0631–0638; G10L 2015/221–228
USPC ....... 704/233, 231, 243, 246, 248, 250, 253, 704/255, 257, 270, 270.1, 27, 5
See application file for complete search history.

(56) References Cited

U.S. PATENT DOCUMENTS

| | | | |
|---|---|---|---|
| 9,202,462 B2 * | 12/2015 | Parada San Martin | G10L 17/18 |
| 2013/0085755 A1 * | 4/2013 | Bringert | G10L 15/28 704/235 |
| 2015/0340030 A1 * | 11/2015 | Sekiguchi | G10L 15/26 704/254 |
| 2015/0379989 A1 * | 12/2015 | Balasubramanian | G06Q 30/0257 704/233 |
| 2017/0358294 A1 * | 12/2017 | Hatfield | G10L 21/0208 |
| 2019/0155566 A1 * | 5/2019 | Dory | G10L 15/22 |

* cited by examiner

*Primary Examiner* — Qi Han
(74) *Attorney, Agent, or Firm* — Haley Guiliano LLP

(57) ABSTRACT

Systems and methods are described for determining whether to activate a voice activated device based on a speaking cadence of the user. When the user speaks with a first cadence the system may determine that the user does not intend to activate the device and may accordingly not to trigger a voice activated device. When the user speaks with a second cadence the system may determine that the user does wish to trigger the device and may accordingly trigger the voice activated device.

20 Claims, 12 Drawing Sheets

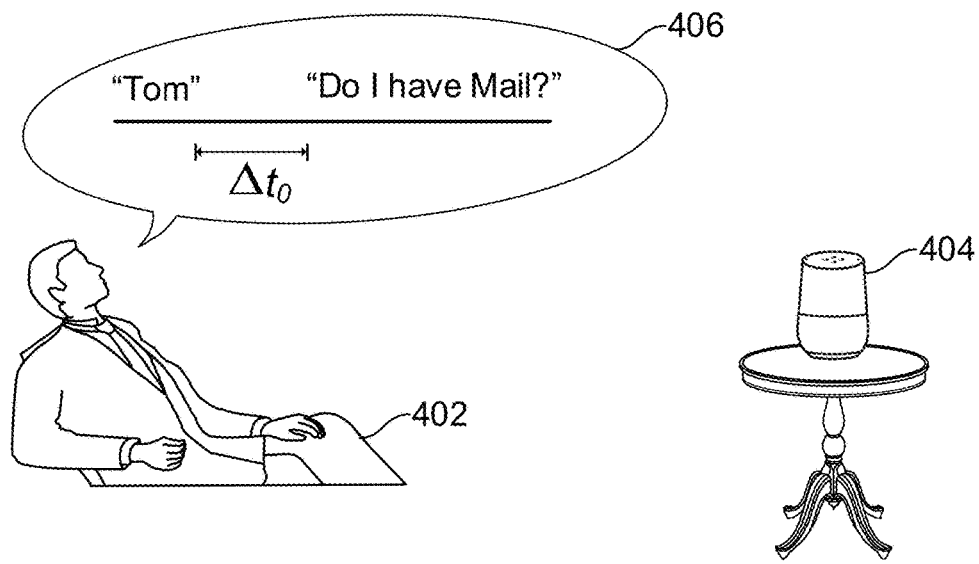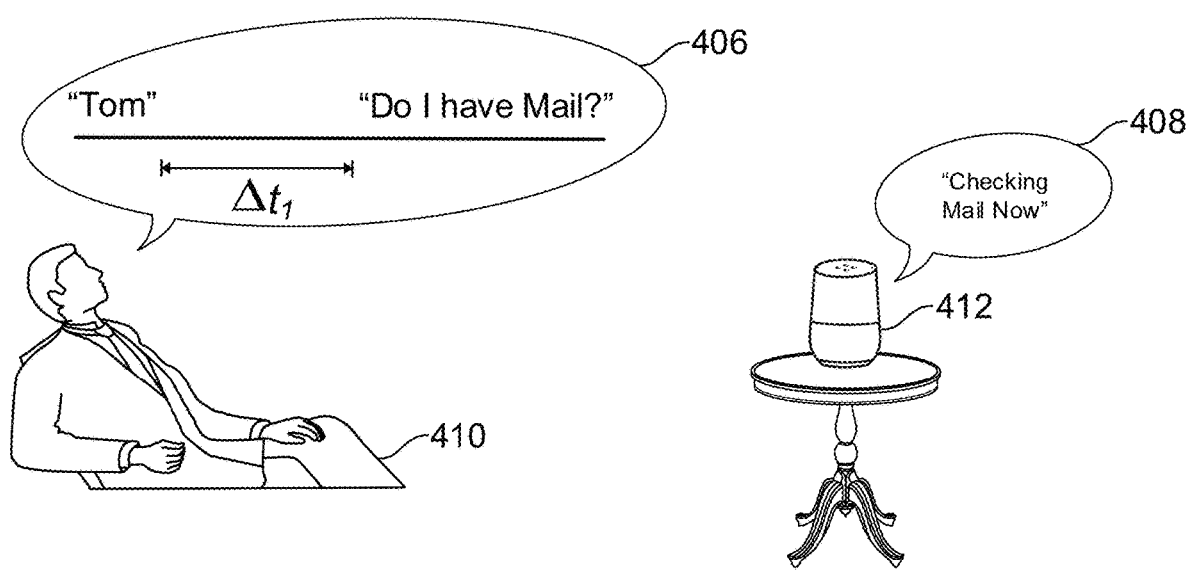
FIG. 4

700

702
Detect an utterance that includes a keyword that is used to activate a voice assistant.

704
Determine, from the utterance, a first period of time between a word spoken immediately prior to the keyword and a second period of time between the keyword and a word spoken immediately after the keyword.

706
Retrieve information about a speaker of the utterance, the information comprising a speaking cadence for the speaker.

708
In response to determining that at least one of the first period of time and the second period of time differs from the speaking cadence for more than a threshold amount, activating the voice assistant.

710
In response to determining that neither of the first period of time nor the second period of time differs from the speaking cadence for more than the threshold amount, refraining from activating the voice assistant.

1102 — Compare the first plurality of utterances to the second plurality of utterances associated with an API of the voice capable device to determine whether an utterance of the first plurality of utterances matches an utterance of the second plurality of utterances.

1104 — Does the utterance of the first plurality of utterances match the utterance of the second plurality of utterances?

— Yes → 1106 — Trigger performance of a function associated with the utterance of the second plurality of utterances by the voice capable user device.

— No ↓

1108 — Prompt the user to confirm the triggering of the voice capable user device.

1110 — Receive a second voice input from the user in response to the prompting.

1112 — Determine that the second voice input does not confirm the triggering of the voice capable user device.

1114 — Determine a cadence associated with the first voice input and the second voice input.

1116 — Update the speaking cadence for the user based on the cadence associated with the first voice input and the second voice input.

1202
Generate a biometric fingerprint uniquely identifying the voice of the user.

1204
Compare the generated biometric fingerprint to a plurality of biometric fingerprints stored in a database, wherein each biometric fingerprint in the database is associated with a unique user profile.

1206
Determine, based on comparing, that the generated biometric fingerprint matches a biometric fingerprint, of the plurality of biometric fingerprints, that corresponds to the profile of the user.

1208
Retrieve a voice model indicative of a voice signature corresponding to the user from the profile of the user.

1210
Generate a fingerprint for the first utterance based on the voice model associated with the user

1212
Compare the fingerprint for the first utterance to a fingerprint associated with the keyword.

FIG. 12

SYSTEMS AND METHODS FOR DETERMINING WHETHER TO TRIGGER A VOICE CAPABLE DEVICE BASED ON SPEAKING CADENCE

CROSS-REFERENCE TO RELATED APPLICATION

This application is a continuation of U.S. patent application Ser. No. 16/139,453, filed Sep. 24, 2018, which is hereby incorporated by reference herein in its entirety.

BACKGROUND

Voice activated devices oftentimes rely on "always on" listening to trigger functions associated with the voice activated device. Oftentimes, to perform a function associated with the voice activated device, a user must speak a trigger word that is used to prepare the voice activated device for performance of a function associated with the voice command. Each device may be associated with its own unique voice trigger. For example, a voice activated personal assistant may be triggered by stating the name of the assistant (e.g., "John") or by stating a phrase (e.g., "OK cellphone"). Frequently, the trigger words are common words that a user may use in normal conversation. Because conventional voice activated devices merely monitor for detection of a trigger word, the voice activated device may become inadvertently triggered by a conversation that a user is having with another person, or by audio output by a television or radio that includes the trigger word. Inadvertent triggering of a voice controlled device may cause the user frustration because they need to perform additional actions to de-trigger the device or may result in the voice controlled device performing unintentional and erratic functions

SUMMARY

Accordingly, it is advantageous to prevent inadvertent triggering of a voice activated device. The advancement of digital transmission and processing of audio content has increased the speed and efficiency that voice activated devices can detect, process, and respond or react to a voice input. In particular, advancements in audio processing capabilities have enabled low power devices to perform always on listening capabilities that can wake a device into a higher power state upon detection of a keyword or keyword phrase. Though these advancements have enabled devices to quickly react and respond to user queries, these systems oftentimes fail to solve the aforementioned problem because they simply trigger the voice activated device whenever a keyword or keyword phrase is detected, regardless of whether it is a user's intention to trigger the device.

Accordingly, systems and methods are described herein for a voice control application or voice recognition application that determines whether to trigger a voice capable device based on a speaking cadence of the user. For example, when a user intends to trigger a voice activated device, the speaking cadence of the user may significantly vary from a normal speaking cadence for that user, even when speaking the keyword or keyword phrase. For example, a user may state the trigger word, followed by a pause, then followed by a function that he or she wishes for the voice activated device to perform (e.g., "OK cellphone <long pause> tell me the weather"). In contrast, when a user is having conversation with another person, the speaking cadence of the user may not vary in the presence of the keyword or keyword phrase. For example, a user may state to another person "The xPhone is an OK cellphone." While conventional systems may trigger a voice activated device merely based on the presence of a keyword phrase (e.g., "OK cellphone"), the systems and methods described herein prevent the inadvertent activation of the voice capable device by determining, based on the speaking cadence of the user, whether the user is speaking the keyword phrase (e.g., "OK cellphone") to activate the user device or for a different purpose.

The voice control application may detect an utterance that includes a keyword that is used to activate a voice assistant. For example, the voice control application may detect a voice input at a microphone of the voice control application and may transcribe the voice input to speech using a voice to text algorithm. The voice control application may compare the transcribed voice input to a keyword and may determine that the voice input matches the keyword when at least a portion of the transcribed voice input matches the keyword. For example, the voice control application may detect the voice input "OK cellphone <pause> tell me what the weather is" and may transcribe the voice input to text. The voice control application may compare the text to the keyword "OK cellphone" and may determine that the voice input comprising the utterance "OK cellphone" matches the keyword.

The voice control application may determine, from the utterance, a first period of time between a word spoken immediately prior to the keyword and the keyword, or a second period of time between the keyword and a word spoken immediately after the keyword. For example, the voice control application may determine that the first word of the voice input is the keyword (e.g., based on transcribing the voice input and determining that the voice input matches the voice query). Accordingly, the voice control application may determine that the first period of time is zero. The voice control application may determine an amount of time between the keyword and a word spoken immediately after the keyword by analyzing a soundwave recorded by a microphone of the voice control application and identifying a period of silence between the keyword and the word spoken immediately after the keyword. For example, the voice control application may measure the pause period and determine that there is a period of two seconds after the keyword and the word spoken immediately after the keyword (e.g., "tell").

The voice control application may retrieve information about a speaker of the utterance, the information comprising a speaking cadence for the speaker. For example, the voice control application may determine that a user account is associated with the voice control application (e.g., based on authenticating the voice of the user using biometric voice authentication) or an application or device associated with the voice control application. In response to identifying the speaker, the voice control application may retrieve a profile associated with the user comprising a speaking cadence for the user (e.g., a typical amount of time the user pauses between words or a vector representing a typical speaking flow associated with the user).

The voice control application may compare the determined first and second period to the retrieved speaking cadence to determine whether either one of the first and/or second period matches the retrieved speaking cadence. For example, the voice control application may retrieve a speaking cadence for the user that specifies that the user typically pauses 0.5 seconds between each word. The voice control application may retrieve a threshold (e.g., +/−0.5 seconds)

from memory identifying an upper bound and a lower bound for a typical speaking cadence for the user. In response to determining that at least one of the first period and the second period differs from the speaking cadence by at least the threshold amount, the voice control application may activate the voice assistant (e.g., because if the user pauses for a greater amount of time than normal, as determined by the speaking cadence, the user is likely issuing a command to the voice assistant). If the voice control application determines that neither the first period nor the second period differs from the speaking cadence for more than the threshold amount, the voice control application may refrain from activating the voice assistant. For example, the voice control application may determine that when the user states a keyword at a same speed as the speaking cadence, that the user is likely just having a conversation that includes the keyword.

In some aspects, a voice control application may avoid inadvertently triggering, by a user, a voice capable device comprising the voice control application based on a speaking cadence of the user. For example, the voice control application may identify a speaking cadence for the user and may determine that when a keyword for triggering the device is detected, and when the keyword is spoken by the user at a pace matching the cadence, that the user is likely just speaking a sentence that includes the keyword and does not wish to activate the device. Conversely, the voice control application may determine that when a user speaks the keyword at a cadence that differs from a typical cadence for the user, that the user is attempting to activate the voice capable device.

The voice control application may retrieve a voice input from a user comprising a sequence of a plurality of utterances. For example, the voice capable device may comprise a microphone accessible to the voice control application. The voice control application may detect a voice signal at the microphone and may record, at least temporarily, the voice input. The voice control application may determine that the voice input comprises a plurality of utterances (e.g., words or word phrases) based on analyzing a soundwave recorded by the voice control application and detecting periods of silence between spoken words.

The voice control application may compare a plurality of utterances to a keyword stored in memory, where the keyword is associated with triggering a voice capable user device. For example, the voice control application may retrieve, from a configuration file associated with the user device, a keyword associated with triggering the voice capable user device (e.g., the keyword phrase "OK Cellphone"). The voice control application may transcribe the plurality of utterances to text and may compare the text to the keyword phrase.

The voice control application may determine, based on the comparing, whether a first utterance of the plurality of utterances matches the keyword. For example, the voice control application may compare the text of each utterance of the plurality of utterances to the keyword and may determine whether the text of any utterance of the plurality of utterances matches the keyword. The voice control application determines that text of an utterance of the plurality of utterances matches the keyword. For example, the voice control application may determine that the keyword is a name associated with the voice activated device (e.g., "Tom"). The voice control application may compare an utterance of the user ("Tom") to the keyword and may determine whether the utterance matches the keyword. For example, when the voice control application determines that a transcription of the voice input comprises a word (e.g., utterance) matching the keyword, that the user spoke the keyword.

In some embodiments, the voice control application may determine that the keyword comprises a phrase including at least two words. For example, the voice control application may retrieve, a keyword comprising a phrase, such as "OK Cellphone," which is used to activate voice feature of a voice activated device. The voice control application may determine that the first utterance matches the keyword by determining that an utterance comprising at least two words matches the at least two words of the keyword phrase. For example, the voice control application matches the utterance comprising the words "OK cellphone" as spoken by the user to the keyword "OK Cellphone."

In some embodiments, the voice control application may retrieve a voice model indicative of a voice signature corresponding to the user (e.g., a specific way in which the user speaks words and phrases). For example, the voice control application may retrieve, from a profile of the user, a voice model that comprises a mapping between sounds uttered by the user and a corresponding textual representation. For example, the voice control application may prompt a user to perform a voice training by uttering a specific set of keywords in a training set. Based on the training, the voice control application may determine how the user speaks the keyword (e.g., based on determining how a soundwave received at the microphone of the voice controlled device maps to the specific set of keywords in the training set). Based on the voice model associated with the user, the voice control application may generate a fingerprint (e.g., digital representation of the first utterance that can be compared to other text, fingerprints, or for the first utterance. For example, the voice control application may determine, based on the voice model for the user mapping sounds of the user to text, a fingerprint (e.g., a textual or other digital representation of the utterance) for the utterance. For example, the voice control application may determine, based on the voice model, that a waveform received by the microphone of the voice activated device corresponds to the phrase "OK cellphone" and may compare the textual representation (e.g., fingerprint of the keyword) of the keyword with the textual representation of the utterance (e.g., fingerprint of the utterance).

In some embodiments, the voice control application may generate a biometric fingerprint uniquely identifying the voice of the user. For example, the voice control application may identify unique characteristics or features of the voice of the user (e.g., tone, pitch, pace, etc.) and may store in a data structure a value for each of those features that are unique to the user. For example, the voice control application may determine a unique pitch value, tone value and, pace associated with the speaking of the user and may store those values in a profile of the user. The voice control application may compare the generated biometric fingerprint to a plurality of biometric fingerprints stored in a database, wherein each biometric fingerprint in the database is associated with a unique user profile. For example, the voice control application may generate the biometric fingerprint for each user of a plurality of users (e.g., plurality of users having access to the voice activated device). The voice control application may determine, based on the comparing, that the generated biometric fingerprint matches a biometric fingerprint of the plurality of biometric fingerprints, that corresponds to the profile of the user. For example, the voice control application may generate a biometric fingerprint for the voice input (e.g., by analyzing the features of the voice input as discussed above) and may compare those features in the voice input to the features of each biometric fingerprint of the plurality of biometric fingerprints until a match is found. Once the voice control application identifies a biometric fingerprint of the plurality of biometric fingerprints, the voice control application may retrieve a user profile associated with the biometric fingerprint.

In some embodiments, the voice control application may determine a position of the occurrence of the keyword in the voice input of the user and may refrain from triggering the voice assistant in response to determining that the keyword appears late in the voice input from the user. For example, the voice control application may receive a voice input such as "I always use my Tom device to set cooking timers!" The voice control application may determine a position of the first utterance (e.g., the utterance matching the keyword) in the sequence of the plurality of utterances (e.g., the voice input from the user). For example, the voice control application may analyze the exemplary voice input above and may determine that the keyword "Tom" appears as the fifth word in the sentence. The voice control application may refrain from triggering the voice capable user device in response to determining that the position of the first utterance in the sequence of the plurality of utterances is greater than a threshold maximum position. For example, the voice control application may determine whether to trigger the voice assistant based on comparing the position of the keyword in the voice input (e.g., fifth position) to a threshold maximum position (e.g., second position in the voice input). When the voice control application determines that the position of the first utterance is within the threshold maximum position, the voice control application may trigger the voice assistant, or may proceed to determine whether to trigger the voice assistant based on the speaking cadence of the user. When the voice control application determines that the position of the first utterance is not within the threshold maximum position, the voice control application may refrain from triggering the voice assistant. For example, the voice control application may determine, if the utterance matching the keyword appears too late in the voice input (e.g., greater than the threshold position in the voice input), that the user is likely having a conversation with another user that includes the keyword and is not likely trying to trigger the voice assistant.

In response to determining that the first utterance matches the keyword, the voice control application may determine a first period of time between the first utterance and a second utterance immediately preceding the first utterance in the sequence, or a second period of time between the first utterance and a third utterance immediately following the first utterance in the sequence. For example, the voice control application may determine that the first utterance is a first utterance in the sequence of utterances (e.g., the first word in the sentence is the keyword). The voice control application may determine that the first period of time is zero because no word is spoken before the first utterance. The voice control application may compute a second period of time corresponding to the silence between when the first utterance is spoken and between when the third utterance is spoken. For example, the voice control application may analyze a sound wave received from a microphone of the voice control application and may determine, based on the received soundwave, when and for how long there is silence after the first utterance is spoken.

The voice control application may retrieve, from the profile associated with the user, a speaking cadence for the user. For example, the voice control application may authenticate the user as discussed above. The voice control application may retrieve, from the profile associated with the user, a value or an array of values indicating a flow, rhythm, or pace of how the user typically speaks (e.g., how the user speaks when having conversations with friends, how the user speaks when issuing commands to a voice activated device, etc.)

In some embodiments, the voice control application may be trained to identify the speaking cadence for the user based on prompting the user to recite a sequence of utterances, recording how the user speaks the utterances and determining a cadence based on the recited sequence of utterances. The voice control application may receive a second voice input from the user in response to prompting the user. For example, the voice control application may receive a sequence of utterances corresponding to a training sequence associated with the prompt. The voice control application may determine an average amount of time between each utterance of the sequence of utterances in the second voice input. For example, the voice control application may determine the periods of silence, as discussed above, based on a variation between sound received when the user is speaking and when the user is not speaking, between utterances and may determine an amount of time corresponding to the period of silence. The voice control application may sum the times associated with the periods of silence and may divide by the number of periods of silence to determine an average amount of time between utterances. Based on the average amount of time between utterances, the voice control application may store, in a profile of the user, the speaking cadence based on the average amount of time between utterances.

In some embodiments, the voice control application may retrieve a default speaking cadence in response to determining that the user is not associated with a specific speaking cadence for the user (e.g., based on determining that the user has not performed a training sequence). The voice control application may retrieve, from a profile of the user, a region and language spoken by the user. For example, the voice control application may retrieve data from the profile of the user an address associated with the user and may determine the region for the user and a language based on the region. The voice control application may identify, from a database comprising a plurality of language models, a language model of the plurality of language models matching the region and language associated with the user. For example, the voice control application may determine that the user is from the United States and speaks English and may retrieve a default language model modeling the average speaking cadence for an American English speaker. The voice control application may update the speaking cadence for the user based on the cadence in the language model. For example, the voice control application may update the profile of the user to include the default cadence and may update the cadence as the voice control application receives voice inputs from the user to better match the speaking cadence for the user.

The voice control application may determine whether at least one of a first difference between the first period of time and the speaking cadence, and a second difference between the second period of time and the speaking cadence is within a threshold range of time. For example, the voice control application may determine the first period of time and the second period of time as described above and may compare those periods of time to a range of time based on a typical speaking cadence for the user. For example, the voice control application may determine whether one of the first period of time or the second period of time is outside of a range of time that would be typical when a user is attempting to activate the voice assistant.

In some embodiments, the voice control application may determine a threshold range of time based on multiplying the speaking cadence by a first scaling factor corresponding to an upper bound for the threshold range of time. For example, the voice control application may determine that the user typically pauses for one second when issuing a command to a voice assistant of the voice activated device. The voice control application may determine a range of 0.8 to 1.2 seconds for the range of time by multiplying the typical cadence (1 second) with a scaling factor of 0.8 to get the lower bound and 1.2 to get the upper bound.

In response to determining that the at least one of the first difference and the second difference is within the threshold range of time, triggering the voice capable user device according to the keyword. For example, the voice control application may determine that because the user paused within the threshold amount of time before or after saying the keyword, that the user intends to trigger the voice activated user device and may accordingly proceed to trigger the voice activated user device.

In response to determining that neither of the first difference and the second difference is within the threshold range of time, the voice control application refrains from triggering the voice capable user device. For example, the voice control application may determine that, when the user does not pause within the threshold range of time (e.g., because the user is having conversation and is not speaking with a cadence that is typically associated with activating the voice capable device), that the user does not wish to activate the voice capable device, even when the voice control application detects the keyword in the user's voice input.

In some embodiments, the voice control application may identify an application programming interface ("API") associated with the voice capable device comprising a plurality of functions capable of being performed by the voice capable device, where the API is associated with a plurality of utterances that is each associated with a respective function of the plurality of functions of the API. For example, the voice control application may determine that the API comprises a plurality of utterances or words associated with activating each function. For example, the voice control application may determine that the API associated the word "search" with a search function in the API and associated the word "Weather" with a function that recites the weather to the user.

In some embodiments, the voice control application may compare the first plurality of utterances to the second plurality of utterances to determine whether an utterance of the first plurality of utterances matches an utterance of the second plurality of utterances associated with the API. For example, the voice control application may receive a first plurality of utterances via a voice input from the user such as "OK cellphone <pause> weather" the voice control application may transcribe the voice input to text and may compare the text to utterances associated with the API to determine that "Weather" in the voice input matches a "weather" utterance in the API. In response to determining that the utterance of the first plurality of utterances matches the utterance of the second plurality of utterances associated with the API, the voice control application may trigger performance of a function associated with the utterance of the second plurality of utterances by the voice capable user device. For example, the voice control application may trigger the voice capable device to retrieve and recite the weather in response to determining that the user spoke the keyword followed by a word associated with an API of the voice capable device for searching the weather.

In another example, the voice control application may determine, based on the API, that a second application is associated with the utterance associated with the API. For example, the voice control application may determine that a weather application is associated with the utterance "weather" and may command/launch the weather application on the voice capable device in response matching the second utterance ("weather") to the utterance "weather" in the API.

In some embodiments, the voice control application may, in response to determining that the utterance of the first plurality of utterances does not match the utterance of the second plurality of utterances, prompt the user to confirm the triggering of the voice capable user device. For example, the voice control application may determine that when the user does not speak an utterance associated with an API of the voice activated device that the device may have been accidentally triggered (e.g., because maybe the user was just talking about an OK cellphone and not trying to say "OK cellphone" to activate the voice capable device).

In some embodiments, the voice control application may receive a second voice input from the user in response to the prompting. For example, the voice control application may detect at a microphone of the voice activated device a voice input in response to the prompting. The voice control application may convert the voice input to text and may determine whether the second voice input confirms the triggering of the voice capable device. For example, the voice control application may determine whether the second voice input comprises a "Yes," "yeah," or "OK" in response to the prompt "Did you want to activate the device?"

In some embodiments, in response to determining that the second voice input does not confirm the triggering of the voice capable device, the voice control application may determine a cadence associated with the first voice input and may update the cadence stored in the user profile based on the cadence. For example, when the voice control application determines that the voice capable device was inadvertently activated, it may updated a cadence associated with the user's normal speaking cadence to further refine how the voice control application determines whether the speaking cadence of the user corresponds to activating the user device or not.

Accordingly, by receiving a voice input from the user and determining, based on the speaking cadence, whether the user intended to trigger a voice capable user device, a voice control application can determine a user's intent to trigger the voice capable when a trigger keyword is detected in a voice input by the voice control application. It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 4 shows an illustrative user interaction with a voice controlled application, in accordance with some embodiments of the disclosure;

FIG. 7 depicts an illustrative process for avoiding inadvertently triggering a voice assistant based on speaking cadence of a user, in accordance with some embodiments of the disclosure;

FIG. 11 depicts an illustrative process for updating a speaking cadence for the user, in accordance with some embodiments of this disclosure; and FIG. 12 depicts an illustrative process for authenticating a user, in accordance with some embodiments of this disclosure.

DETAILED DESCRIPTION

Figure 1:
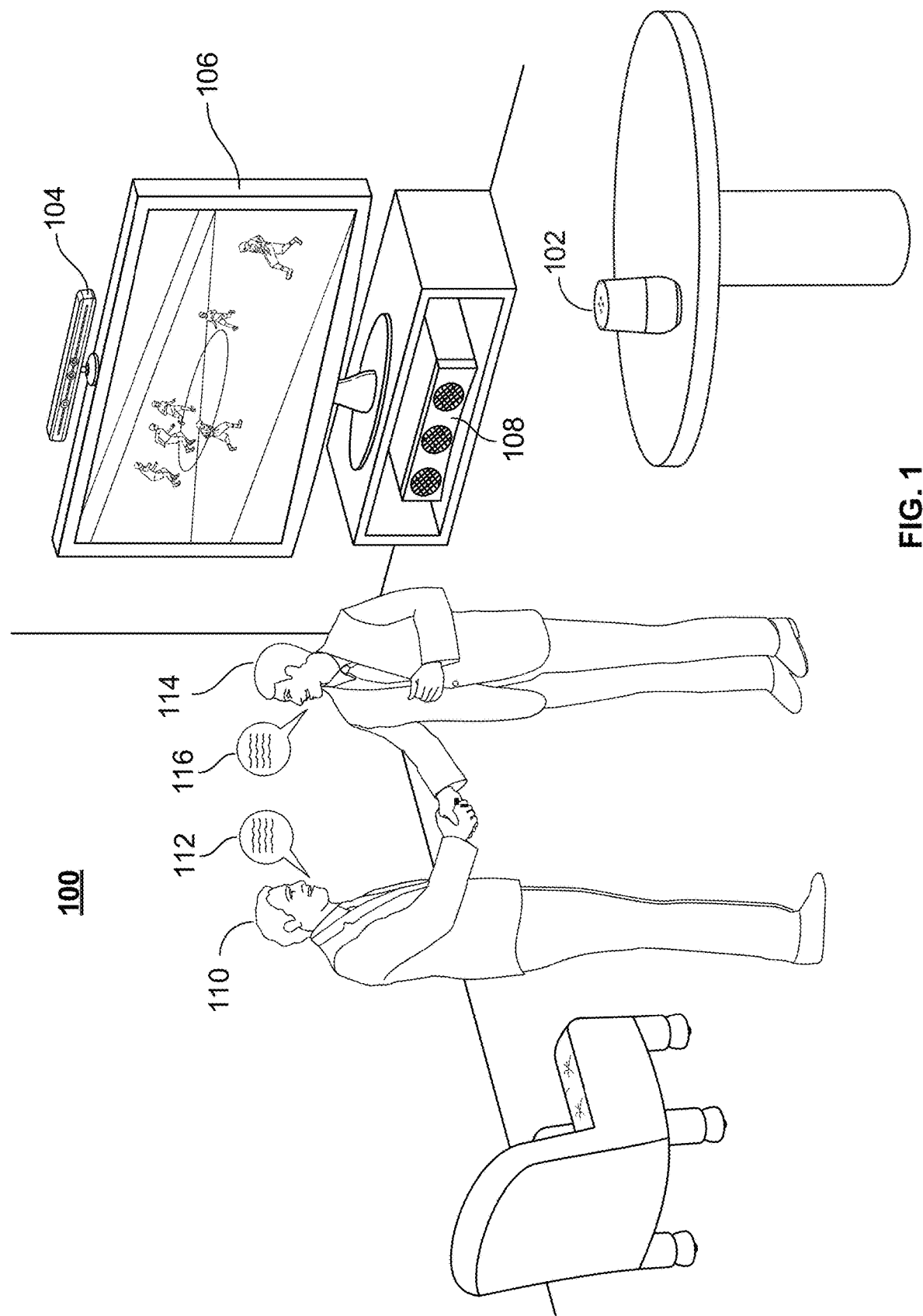
FIG. 1 shows an illustrative embodiment of a household including voice activated user devices, in accordance with some embodiments of the disclosure.

Oftentimes voice activated devices are triggered by a specific keyword used to wake the device from an inactive state. These keywords are frequently words that may be used by the user in normal conversations. For example, a voice capable device named "Tom" may be awoken when a user states the word "Tom." If the user is speaking with a colleague named Tom in the presence of the device—Tom, the voice activated device, may respond whenever the name "Tom" is detected, regardless of whether the user intended to speak to Tom the person or Tom the device. This may frequently lead to frustration by the user and potentially anyone with a name close to that of the device. Accordingly, it is preferable for a voice activated device to be able to detect when the user is speaking a keyword with the intent of activating the device or is speaking the keyword with a different intent.

When a user intends to trigger a voice activated device, the speaking cadence of the user may vary from a speaking cadence for that user when he/she is having conversation with a colleague. For example, when a user wishes to activate a voice activated device, a user may typically state the trigger word, followed by a pause, then followed by a function that he or she wishes for the voice activated device to perform (e.g., "Tom <long pause> what's the weather").

In contrast, when a user is having conversation with another person, the speaking cadence of the user may not vary in the presence of the keyword or keyword phrase. For example, a user may state to a colleague "Hey Tom, what's the weather like?" without a long pause between "Tom" (the keyword) and a subsequent word. While conventional systems may trigger a voice activated device merely based on the presence of a keyword phrase (e.g., "Tom"), the systems and methods described herein prevent the inadvertent activation of the voice capable device by differentiating between whether the user is speaking the keyword phrase (e.g., "Tom") to activate the user device or for a different purpose, based on the speaking cadence of the user.

The voice control application may detect an utterance that includes a keyword that is used to activate a voice assistant. For example, the voice control application may detect a voice input at a microphone of the voice control application and may transcribe the voice input to speech using a voice to text algorithm. The voice control application may compare the transcribed voice input to a keyword and may determine that the voice input matches the keyword when at least a portion of the transcribed voice input matches the keyword. For example, the voice control application may detect the voice input "Tom <pause> tell me what the weather is" and may transcribe the voice input to text. The voice control application may compare the text to the keyword "Tom" and may determine that the voice input comprising the utterance "Tom" matches the keyword "Tom."

The voice control application may determine, from the utterance, a first period of time between a word spoken immediately prior to the keyword and the keyword, or a second period of time between the keyword and a word spoken immediately after the keyword. For example, the voice control application may determine an amount of time that the user pauses between saying the keyword, "Tom," and a word immediately preceding the keyword and a word immediately following the keyword. For example, for the voice input "Hey Tom, what's the weather?" The voice control application may determine that there is a pause of 0.1 seconds between the words "Hey" and "Tom" and a pause of 0.6 seconds between the words "Tom" and "what's."

The voice control application may retrieve information about a speaker of the utterance, the information comprising a speaking cadence for the speaker. For example, the voice control application may determine that a user account is associated with the voice control application (e.g., based on authenticating the voice of the user using biometric voice authentication). In response to identifying the speaker, the voice control application may retrieve a profile associated with the user comprising a speaking cadence for the user (e.g., a typical amount of time the user pauses between words or a vector representing a typical speaking flow associated with the user).

The voice control application may compare the determined first and second period to the retrieved speaking cadence to determine whether either one of the first and/or second period matches the retrieved speaking cadence. For example, the voice control application may retrieve a speaking cadence for the user that specifies that the user as typically pausing 0.5 seconds between each word. The voice control application may retrieve a threshold (e.g., +/−0.5 seconds) from memory identifying an upper bound and a lower bound for a typical speaking cadence for the user. In response to determining that at least one of the first period and the second period differs from the speaking cadence by at least the threshold amount, the voice control application may activate the voice assistant (e.g., because if the user pauses for a greater amount of time than normal, as determined by the speaking cadence, the user is likely issuing a command to the voice assistant). If the voice control application determines that neither the first period nor the second period differs from the speaking cadence for more than the threshold amount, the voice control application may refrain from activating the voice assistant. For example, the voice control application may determine that when the user states a keyword at a same speed as the speaking cadence, that the user is likely just having a conversation that includes the keyword.

The amount of content, capabilities, and functions available to users on an electronic device can be substantial. Consequently, many users desire a form of a device control interface that allows users to efficiently issue commands to control a device, launch applications, search for media and information, etc. For example, modern cellphone interfaces may require for a user to search through multiple menus to toggle and control functions associated with the cellphone. For example, to set a timer on a user's cellphone, the user may require launching a page listing applications that are installed on the user's phone, opening the clock application, selecting a timer tab within the clock application, and then finally enabling the timer. Users may benefit from an application that allows users to easily issue commands and control a device without the need for knowing and navigating the complexities of a device. Such applications may allow for a user to issue commands and control a device using their voice. For example, a device may detect a voice command "Start Timer" and may, in response to detecting the voice command, initiate a timer on the device. An application that provides such functionality is referred to herein as a voice control application or, sometimes, a voice recognition application or voice application.

In some implementations, voice control applications may include a plurality of modules, applications, APIs and may be implemented on a plurality of devices and systems to execute the features and functionalities of the voice control application. The voice control application may be configured such that features of the voice control application that require processing capabilities beyond that of a user device are performed on a server associated with the voice control application while other capabilities of the voice control application are performed on a user device. For example, a voice control application may comprise a first module implemented on a first device that detects when a user speaks to the device and may perform preliminary processing on the sound input to determine whether the user spoke a keyword associated with the device. The voice control application may comprise a second module implemented on a second device for performing additional processing on the sound input, such as verifying that the keyword was spoken by the user and extracting any additional commands that may have been included in the voice input.

Voice control applications may take various forms depending on the various features and capabilities of a system associated with the voice control application. One typical type of voice control application is an "always on" voice control application that continuously listens to nose in an environment of a device associated with the voice control application and will respond once a wake word, keyword and/or other activation word is identified by the voice control application. Always on voice control applications allow for a device to run in a low power mode while the user is not interacting with the device and will turn on when the voice control application detects that the user has spoken a keyword. A second typical type of voice control application is an on demand voice control application that is activated based on a button press (e.g., via a GUI associated with the voice control application or via a hardware button associated with the device). For example, an on demand voice control application may generate for display a button on a display corresponding to a device associated with the voice control application. In response to receiving a user selection of the button, the voice control application may activate a microphone and may begin listening for a voice prompt from the user. An on demand voice control application may cease listening for a user's voice prompt after receiving a voice prompt from the user and/or after a specified amount of time has passed without detecting a user's voice input. In some implementations, the voice control application may comprise an always on component and an on demand component. For example, some implementations of the voice control application may continuously monitor for voice input and may also allow for a user to select a button on an interface of the voice control application (e.g., a button on a GUI associated with the voice control application or a hardware button on a device associated with the voice control application).

The voice control application and/or any instructions for performing any of the embodiments discussed herein may be encoded on computer readable media. Computer readable media may include any media that is capable of storing data, such as RAM, flash storage, etc. The computer readable medium may be transitory (e.g., circuitry for propagating electrical or electromagnet signals), or may be non-transitory (e.g., volatile and non-volatile memory).

In some embodiments, the voice control application may take the form of a standalone application. For example, the voice control application may be an application, such as a digital assistant application comprising the necessary software and firmware for accessing and interfacing with the hardware of a device associated with the voice control application. The voice control application may comprise an API or similar for interfacing with other applications and software or hardware interfaces. For example, the standalone voice controlled application may comprise a voice assistant implementation that is capable of interfacing with a user's email account via an API that is compatible with both the voice assistant implementation and the user's email account provider. In another example, the voice control application may utilize an API to interface with other hardware devices, such as lights in a user's home and/or appliances.

In some embodiments, the voice control application may be a component of another application or a system. For example, the voice control application may be integrated as a software component of an operating system associated with a user device, or may be an application installed on the operating system of the user device. For example, the voice control application may comprise a set of instructions for processing and interpreting voice inputs from the user and may be integrated with an operating system kernel to access hardware, such as a microphone and speakers, for listening to and responding to user voice queries. The voice control application may be installed on the operating system as an application (e.g., an .apk file installed on an Android operating system) or may be a component integrated into the operating system (e.g., a voice recognition component or assistant in Windows).

As referred to herein, the phrase "user equipment device," "user equipment," "user device," "electronic device," "voice activated device," "voice controlled device," "voice recognition device," "electronic equipment," or "voice assistant" should be understood to mean any device for accessing and/or searching for information, or performing a function associated with the device (e.g., device associated with the voice control application) or another device (e.g., a networked device accessible to the voice control application), such as a Smart TV, a personal computer (PC), a laptop computer, a tablet computer, a mobile telephone, a smart home hub, smart speaker or any other computing equipment, or wireless device, internet of things (IOT) device and/or combination of the same.

In some embodiments, the user equipment device may have one or more screens to depict a GUI of a voice assistant associated with the voice control application. Display screens and audio prompts, such as those depicted in FIGS. 1-4, may be presented on a screen of the user equipment by a voice control application (e.g., in response to detecting a keyword by the user or to respond to a user voice query) or may be output by a speaker of a device associated with the voice control application. In some embodiments, the user equipment may comprise a microphone for listening to audio input from a user. In some embodiments, the user equipment may comprise a speaker for interfacing with the user (e.g., responding to voice commands from the user). On these user equipment devices, users may be able to interface with voice control application to locate information, control the device (e.g., the device associated with the voice control application) and other user devices, etc. (e.g., by issuing a voice command to the voice control application and by the voice control application issuing a command to a network connected device under control of a voice assistant associated with the voice control application).

In some embodiments, the voice control application may integrate with a plurality of services to locate information, content, or to perform commands issued by a user. For example, the voice control application may integrate with a subscription news service associated with the user to search a database of the news service for articles searched for by the user. In another example, the voice control application may be associated with a smart home control provider and may utilize a database of the smart home control provider to interface with and control appliances or other devices in the user's household.

In some embodiments, the voice control application may be provided as an on-line application (i.e., provided having a persistent connection to a remote server), or as a stand-alone application or clients on user equipment devices. For example, a voice control application may comprise a component implemented on a device of a user and may comprise a component implemented on a server associated with a developer of the voice control application. For example, the voice control application may comprise a component on the user device for monitoring for and responding to sound input detected in an environment of a user device implementing the voice control application. The voice control application may transmit, over a network connection, a received voice signal and the voice signal may be processed by a component of the voice control application on a server located remote to the user device. In response to the transmitting, the voice control application at the user device may receive a transcription of the voice input. Various devices and platforms that may implement a voice control application are described in more detail below.

One of the functions of the voice control application is to provide an interface for users to interact with and control devices associated with the user. FIGS. 1-4 show illustrative display screens and contain illustrative audio prompts for audio devices that have exemplary implementations of a voice control application. The display screens and audio prompts shown in FIGS. 1-4 may be implemented on any suitable device or platform.

In some embodiments, a user may indicate a desire to access a voice control application by selecting a selectable option provided in a display screen (e.g., an icon), pressing a dedicated button (e.g., a VOICE button) on a user device, or by speaking a keyword associated with waking a voice controlled device, or via use of other user input interfaces or devices (e.g., an IOT button or microphone associated with a user device implementing the voice control application). In some embodiments, the voice control application may utilize a combination of an audible and a visual response to a user's indication (e.g., the voice control application may generate a display of a screen depicting a response to the user's indication and may audibly recite the response to the user's indication).

In some embodiments, control circuitry 504 and/or remote control circuitry 524, discussed further in relation to FIG. 5 below, executes instructions for a voice control application (e.g., a software and/or hardware implementation of local voice processing module 518 or remote voice processing module 520) stored in memory (i.e., storage 508 or remote storage 528). Specifically, control circuitry 504 and/or remote control circuitry 524 may be instructed by the voice control application to perform the functions discussed above and below. For example, the voice control application may provide instructions to control circuitry 504 (e.g., via local voice processing module 518) to monitor for audio input via user input interface 510, generate the displays and/or to provide audio output via speakers 514 discussed in relation to FIG. 1, FIG. 2, FIG. 3 and FIG. 4. In some embodiments, the voice control application may instruct remote control circuitry 524 to perform some or all of the voice control application functions, such as verifying a keyword entered by the user. In response to verifying the keyword, remote control circuitry 524 may transmit (e.g., via I/O path 522 over network 534) an indication whether the keyword was verified by voice control application (e.g., via remote voice processing module 520). In some implementations, any action performed by control circuitry 504 and/or remote control circuitry 524 may be based on instructions received from the voice control application (e.g., a voice control application implemented on local voice processing module 518, remote voice processing module 520 and/or any combination of local voice processing module 518 and remote voice processing module 520).

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

FIG. 1 shows an illustrative embodiment of a household including voice activated user devices, in accordance with some embodiments of the present disclosure. Household 100 is depicted having user 110 and user 114. User 110 is reciting speech 112 and user 114 is reciting speech 116. Household 100 is depicted having a plurality of voice activated devices, such as voice assistant 102 and voice activated media device 106. Voice activated device 106 is depicted having microphone 104 and speaker 108 for receiving voice commands from a user (e.g., via microphone 104) and responding to the voice commands (e.g., via speaker 108). In some embodiments, voice assistant 102 may comprise an embedded microphone and speaker (not depicted in FIG. 1) for receiving voice input from the user and for communicating to the user. In some embodiments, voice activated device 106 and/or voice assistant 102 may comprise a voice control application configured to utilize a speaking cadence of the user to determine whether the user intends to activate voice features associated with voice activated device 106 or voice assistant 102. Exemplary processes for determining whether the user wishes to activate a voice features associated with voice activated device 106 or voice assistant 102 are described below in detail in relation to FIG. 7-FIG. 11.

In some aspects, a voice control application may avoid inadvertently triggering, by a user, a voice capable device comprising the voice control application based on a speaking cadence of the user. For example, the voice control application may identify a speaking cadence for the user (e.g., user 110) and may determine that when a keyword for triggering the device is detected, and when the keyword is spoken by the user at a pace matching the cadence, that the user (e.g., user 110) is likely just speaking having a conversation with another user (e.g., user 114) that the keyword and does not wish to activate the device. Conversely, the voice control application may determine that when a user (e.g., user 110) speaks the keyword at a cadence that differs from a typical cadence for the user, that the user is attempting to activate the voice capable device.

The voice control application may retrieve a voice input from a user comprising a sequence of a plurality of utterances. For example, the voice activated device 106 or voice assistant 102 may receive, via a microphone accessible to the voice control application, (e.g., microphone 104) a voice input from the user (e.g., user 110). The voice control application may detect a voice signal at microphone 104 corresponding to speech 112 or speech 116 and may record, at least temporarily, the voice input on storage accessible to the voice control application (e.g., storage for the hardware of voice activated device 106 or voice assistant 102). The voice control application may determine that the voice input comprises a plurality of utterances (e.g., words or word phrases) based on analyzing a soundwave recorded by the voice control application and detecting periods of silence between spoken words.

The voice control application may compare a plurality of utterances to a keyword stored in memory, where the keyword is associated with triggering a voice capable user device. For example, the voice control application may retrieve, over a network connection associated with the voice activated device 106 and/or voice assistant 102, or from a configuration file stored locally on the device, a keyword associated with triggering the voice capable user device (e.g., the keyword phrase "OK cellphone"). The voice control application may transcribe the plurality of utterances to text (e.g., the plurality of utterances in speech 112 or speech 116) and may compare the text to the keyword phrase.

The voice control application may determine, based on the comparing, whether a first utterance of the plurality of utterances (e.g., the plurality of utterances in speech 112 or speech 116) matches the keyword. For example, the voice control application may compare the text of each utterance of the plurality of utterances to the keyword and may determine whether the text of any utterance of the plurality of utterances matches the keyword. The voice control application determines that text of an utterance of the plurality of utterances matches the keyword. For example, the voice control application may determine that the keyword is a name associated with voice activated device 106 or voice assistant 102 (e.g., "Tom"). The voice control application may compare an utterance of the user ("Tom") to the keyword and may determine whether the utterance matches the keyword. For example, when the voice control application determines that a transcription of the voice input (e.g., the voice input corresponding to speech 112 or speech 116) comprises a word (e.g., utterance) matching the keyword, that one of user 110 or user 114 spoke the keyword.

In some embodiments, the voice control application may determine that the keyword comprises a phrase including at least two words. For example, the voice control application may retrieve, a keyword comprising a phrase, such as "OK cellphone" which is used to activate voice feature of a voice activated device. The voice control application may determine that the first utterance matches the keyword by determining that an utterance comprising at least two words matches the at least two words of the keyword phrase. For example, the voice control application matches the utterance comprising the words "OK cellphone" as spoken by either user 110 or user 114 to the keyword "OK cellphone".

In some embodiments, the voice control application may retrieve a voice model (e.g., via a network connection associated with voice assistant 102 or voice activated device 106) indicative of a voice signature corresponding to the user (e.g., a specific way in which user 110 or user 114 speaks words and phrases). For example, the voice control application may retrieve, from a profile of the user (e.g., user 110 or user 114), a voice model that comprises a mapping between sounds uttered by the user and a corresponding textual representation. For example, the voice control application may construct a voice model based on prompting user 110 or user 114 to recite a sequence of words and identifying the unique characteristics of how the user recites the sequence of words. For example, the voice control application may determine that user 110 has a lisp and resultantly pronounces words with a "s" similarly to the typical sound for a "th." Accordingly, the voice control application may construct a voice model that interprets voice input having a "th" sound as either an "s" or "th" text.

For example, the voice control application may prompt a user 110 or user 114 to perform a voice training by uttering a specific set of keywords in a training set. Based on the training, the voice control application may determine how the user 110 or user 114 speaks the keyword (e.g., based on determining how a soundwave received at microphone 104 of voice activated device 106 or voice assistant 102 maps to the specific set of keywords in the training set). Based on the voice model associated with the user, the voice control application may generate a fingerprint (e.g., digital representation of the first utterance that can be compared to other text, fingerprints, for the first utterance. For example, the voice control application may determine, based on the voice model for the user mapping sounds of the user to text, a fingerprint (e.g., a textual or other digital representation of the utterance) for the utterance. For example, the voice control application may determine, based on the voice model, that a waveform received by the microphone of the voice activated device corresponds to the phrase "OK cellphone" and may compare the textual representation (e.g., fingerprint of the keyword) of the keyword with the textual representation of the utterance (e.g., fingerprint of the utterance).

In some embodiments, the voice control application may generate a biometric fingerprint uniquely identifying the voice of the user (e.g., user 110 or user 114). For example, the voice control application may identify unique characteristics or features of the voice of the user (e.g., tone, pitch, pace, etc.) and may store in a data structure a value for each of those features that are unique to the user. For example, the voice control application may determine a unique pitch value, tone value and, pace associated with the speaking of the user and may store those values in a profile of the user (e.g., in a data structure associated with the unique fingerprint of the user). The voice control application may compare the generated biometric fingerprint to a plurality of biometric fingerprints stored in a database, wherein each biometric fingerprint in the database is associated with a unique user profile. For example, the voice control application may access, via a network connection associated with voice assistant 102 of the voice activated device 106, the biometric fingerprint for each user of a plurality of users (e.g., plurality of users having access to the voice activated device). The voice control application may determine, based on the comparing, that the generated biometric fingerprint matches a biometric fingerprint of the plurality of biometric fingerprints, that corresponds to the profile of the user. For example, the voice control application may generate a biometric fingerprint for the voice input (e.g., by analyzing the features of the voice input as discussed above) and may compare those features in the voice input to the features of each biometric fingerprint of the plurality of biometric fingerprints until a match is found. Once the voice control application identifies a biometric fingerprint of the plurality of biometric fingerprints, the voice control application may retrieve a user profile associated with the biometric fingerprint (e.g., a user profile associated with user 110 or user 114).

In some embodiments, the voice control application may determine a position of the occurrence of the keyword in the voice input of the user and may refrain from triggering the voice assistant in response to determining that the keyword appears late in the voice input from the user. For example, the voice control application may receive a voice input such as "I love using my Tom device to set cooking timers!" via microphone 104 of voice activated device 106 or voice assistant 102. The voice control application may determine a position of the first utterance (e.g., the utterance matching the keyword) in the sequence of the plurality of utterances (e.g., the voice input from the user). For example, the voice control application may analyze the voice input received from microphone 104 and may detect periods of silence in the audio signal as discussed above. In response to detecting the periods of silence, the voice control application may determine that the user uttered a separate word. The voice control application may count the number of words (e.g., based on detecting the periods of silence in the voice signal) to determine a number of words preceding the first utterance in the voice signal. For example, the voice control application may analyze the exemplary voice input above and may determine that the keyword "Tom" appears as the fifth word in the voice input.

In some embodiments, the voice control application may refrain from triggering the voice capable user device in response to determining that the position of the first utterance in the sequence of the plurality of utterances is greater than a threshold maximum position. For example, the voice control application may receive a threshold maximum position of the keyword in the voice signal received from the user (e.g., user 110 or 114 via microphone 104). For example, control circuitry 504 may receive from storage 508 or voice control data source 618 a value indicating a threshold maximum position for the keyword in the voice input. For example, control circuitry 504 may transmit a region and language associated with user 110 or 114 to a database and, based on the transmitting, may receive a value indicating a threshold maximum position in the voice input where the keyword would appear if the user was trying to activate the voice controlled user device.

In some embodiments, the voice control application may determine whether to trigger the voice assistant based on comparing the position of the keyword in the voice input (e.g., fifth position) to a threshold maximum position (e.g., second position in the voice input). For example, the voice control application may determine if the utterance matching the keyword appears too late in the voice input (e.g., greater than the threshold position in the voice input) that the user is likely having a conversation with another user that includes the keyword and is not likely trying to trigger the voice assistant.

In some embodiments, the voice control application may trigger the voice assistant, or may proceed to determine whether the trigger the voice assistant based on the speaking cadence of the user in response to determining that the position of the first utterance is within the threshold maximum position. For example, the voice control application may determine that the position of the first utterance is two in the voice input ("Hey Tom, turn on the lights"). In response to determining that the position is two, the voice control application may compare the position to the threshold (five) and may determine that based on the position, the user is likely trying to activate the voice assistant (e.g., because the keyword "Tom" appears at a beginning of the voice input). In response to the determination, the voice control application may trigger voice assistant 102 or voice activated device 106 or may proceed to process the voice input to determine, based on a speaking cadence of the user, whether to trigger voice assistant 102 or voice activated device 106. Although the aforementioned embodiments are discussed with respect to a threshold maximum position of a keyword in the voice input, a person of ordinary skill in the art could likewise utilize a threshold minimum input and apply the threshold minimum without departing from the scope of the embodiment.

In some embodiments, the voice control application may dynamically compute the threshold maximum or minimum based on a characteristic of the user. For example, the voice control application may determine the threshold maximum or minimum based on a language and region associated with the user. In another example, the voice control application may monitor for a typical position of the keyword in a plurality of voice inputs by the user and may choose the threshold maximum or minimum value based on where, in a voice input, the user typically speaks the keyword. For example, if the user typically states the keyword as the third word of a voice input, the voice control application may set a threshold maximum to be close to three (e.g., four).

In response to determining that the first utterance matches the keyword, the voice control application may determine a first period of time between the first utterance and a second utterance immediately preceding the first utterance in the sequence or a second period of time between the first utterance and a third utterance immediately following the first utterance in the sequence. For example, the voice control application may identify a plurality of utterances in speech 112 or speech 116 as described above. The voice control application may determine that the first utterance is a first utterance in the sequence of utterances (e.g., the first word in the sentence is the keyword) based on detecting a long period of silence (e.g., a period of silence greater than ten times the normal cadence for the user), before a beginning of the first utterance. For example, the voice control application may determine that the first period of time is zero because no word is spoken before the first utterance or may determine that the first period of time is a large value due to the prolonged silence before the first utterance.

The voice control application may compute a second period of time corresponding to the silence between when the first utterance is spoken and between when the third utterance is spoken. For example, the voice control application may analyze a sound wave received from a microphone 104 and may determine, based on the received soundwave, when and for how long there is silence after the first utterance is spoken.

In some embodiments, the voice control application may determine the at least one of the first and the second period based on analyzing the received sound waveform corresponding to the voice input and comparing the voice input to a sound profile for an environment associated with the voice activated device. For example, the voice control application may determine, when a user is not speaking, an ambient noise level for household 100 in which voice activated user device 106 and voice assistant 102 is located. For example, the voice control application may record audio of household 100 via microphone 104 and may determine that when neither user 110 nor user 114 is speaking that there is 2 dB of noise detected by the microphone 104. For example, the 2 dB of noise may be, for example, ambient noise from a fan. As referred to herein, the term "silence" refers to any period in which a noise level is below a threshold. For example, a period of silence near a highway could include all the ambient noise caused by cars travelling on the highway but may exclude periods of time where there is honking or tires squealing (e.g., because those noises may be louder than a typical noise level near the highway).

Accordingly, the voice control application may compute the first and the second period by determining that there is a period of silence between two utterances in speech 112 or speech 116 (e.g., a period where the noise is close two or equal to the ambient noise level detected by the voice control application). For example, the voice control application may determine that when user 110 or user 114 is speaking, that microphone 104 receives 50 dB level of sound but when neither user 110 nor user 114 is speaking, that microphone 104 receives 10 dB level sound. Because of the disparity detected by microphone 104 between the sound when user 110 or user 114 is speaking and the sound when neither user 110 nor user 114 is speaking, the voice control application may determine that even when there is 10 dB level of sound that it is a period of silence because it is silent relative to the 50 dB detected when the user is speaking.

The voice control application may retrieve, from the profile associated with the user (e.g., user 110 or user 114), a speaking cadence for the respective user. For example, the voice control application may authenticate the user as discussed above. The voice control application may retrieve, from the profile associated with the user, a value or an array of values indicating a flow, rhythm, or pace of how the user typically speaks. For example, the voice control application may monitor a conversation between user 110 and user 114 (e.g., when the users are not speaking to voice activated device 106 and voice assistant 102) to determine how each of the users speak when having conversations and may contrast a cadence associated with how the users speak amongst each other with a cadence when, the users are issuing commands to voice activated device 106 and voice assistant 102.

In some embodiments, the voice control application may identify the speaking cadence for the user based on prompting the user to recite a sequence of utterances, recording how the user speaks the utterances and determining a cadence based on the recited sequence of utterances. For example, the voice control application may receive, a sequence of training utterances to be recited by the user. The voice control application may generate an audio signal and may output the audio signal from a speaker, such as speaker 108 or may display the training utterances on a display, such as a display associated with voice activated device 106. In response to prompting the user, the voice control application may await an audio input from the user via microphone 104 reciting the utterances. The voice control application may receive a second voice input from user 110 or user 114 via microphone 104 in response to prompting the users. In response to receiving the second voice input via microphone 104, the voice control application may determine an average amount of time between each utterance of the sequence of utterances in the second voice input. For example, the voice control application may determine the periods of silence, as discussed above based on a variation between sound received when the user is speaking and when the user is not speaking, between utterances and may count an amount of time corresponding to the period of silence. The voice control application may sum the times associated with the periods of silence and may divide by the number of periods of silence to determine an average amount of time between utterances. Based on the average amount of time between utterances, the voice control application may store, in a profile of the user (e.g., user 110 or user 114), the speaking cadence based on the average amount of time between utterances.

In some embodiments, the voice control application may identify the speaking cadence based on prior interactions with the user. For example, the voice control application may develop a model speaking cadence for the user based on a machine learning algorithm that updates whenever the user successfully activates the voice activated device (e.g., by detecting the keyword via microphone 104). For example, the voice control application may, during a training period, analyze substantially all, or a subset of all voice inputs received by the user. The voice control application may detect whether a voice input was intended to activate the voice activated device (e.g., by prompting user 110 or user 114), and when the voice input was intended to activate the device, may determine a speaking cadence associated with that voice input (e.g., the voice input used to activate the voice activated device).

In some embodiments, the voice control application may retrieve a default speaking cadence in response to determining that the user is not associated with a specific speaking cadence for the user (e.g., based on determining that the user has not performed a training sequence). The voice control application may retrieve, from a profile of the user, a region and language spoken by the user. For example, the voice control application may retrieve data from the profile of the user an address associated with the user and may determine the region for the user and a language based on the region. The voice control application may identify, from a database comprising a plurality of language models, a language model of the plurality of language models matching the region and language associated with the user. For example, the voice control application may determine that user 110 is from the United States and speaks English (e.g., based on preferences of user 110 stored on the profile for the user) and may retrieve a default language model modeling the average speaking cadence for an American English speaker. In another example, the voice control application may determine that user 114 is from Great Britain and speaks English (e.g., based on location profile data associated with user 114) and may retrieve a language model comprising an average speaking cadence for a a British English speaker. The voice control application may update the speaking cadence for the user based on the cadence in the language model. For example, the voice control application may update the profile of the user to include the default cadence and may update the cadence as the voice control application receives voice inputs from the user to better match the speaking cadence for the user.

The voice control application may determine whether at least one of a first difference between the first period of time and the speaking cadence, and a second difference between the second period of time and the speaking cadence is within a threshold range of time. For example, the voice control application may determine the first period of time and the second period of time as described above and may compare those periods of time to a range of time based on a typical speaking cadence for the user. For example, the voice control application may determine whether one of the first period of time or the second period of time is outside of a range of time that would be typical when a user is attempting to activate the voice assistant as described below.

In some embodiments, the voice control application may determine a threshold range of time based on multiplying the speaking cadence by a first scaling factor corresponding to an upper bound for the threshold range of time. For example, the voice control application may determine that the user typically pauses for one second when issuing a command to a voice assistant of the voice activated device. The voice control application may determine that a range of 0.8 to 1.2 seconds for the range of time by multiplying the typical cadence (1 second) with a scaling factor of 0.8 to get the lower bound and 1.2 to get the upper bound. The voice control application may determine the scaling factor by, for example, querying a database associated with a language model for the region and language associated with the user and may receive, in response to the querying, a language model indicating the scaling factors.

In response to determining that the at least one of the first difference and the second difference is within the threshold range of time, triggering the voice capable user device according to the keyword. For example, the voice control application may determine that because the user paused within the threshold amount of time before or after saying the keyword, that the user intends to trigger the voice activated user device and may accordingly proceed to trigger the voice activated user device.

In response to determining that neither of the first difference and the second difference is within the threshold range of time, the voice control application may refrain from triggering the voice capable user device. For example, the voice control application may determine that when the user does not pause within the threshold range of time (e.g., because the user is having conversation and is not speaking with a cadence that is typically associated with activating the voice capable device) that the user does not wish to activate the voice capable device, even when the voice control application detects the keyword in the user's voice input.

In some embodiments, the voice control application may identify an application programming interface ("API") associated with voice capable device comprising a plurality of functions capable of being performed by the voice activated device 106 or voice assistant 102, where the API is associated with a plurality of utterances that is each associated with a respective function of the plurality of functions of the API. In some instances, voice activated device 106 may share an API with voice assistant 102 and/or may be associated with two different APIs. In some instances, voice activated device 106 may communicate with voice assistant 102, and vice versa, via a third API distinct from an API associated with each of the devices. For example, the voice control application may determine that the API comprises a plurality of utterances or words associated with activating each function. For example, the voice control application may determine that the API associated the word "search" with a search function in the API and associated the word "weather" with a function that recites the weather to the user.

In some embodiments, the voice control application may compare the first plurality of utterances to the second plurality of utterances to determine whether an utterance of the first plurality of utterances matches an utterance of the second plurality of utterances associated with the API. For example, the voice control application may receive, via microphone 104, a first plurality of utterances via a voice input from the user (e.g., user 110 or user 114) such as "OK cellphone <pause> weather." The voice control application may transcribe the voice input to text and may compare the text to utterances associated with the API to determine that "Weather" in the voice input matches a "weather" utterance in the API. In response to determining that the utterance of the first plurality of utterances matches the utterance of the second plurality of utterances associated with the API, the voice control application may trigger performance of a function associated with the utterance of the second plurality of utterances by the voice capable user device. For example, the voice control application may trigger the voice capable device to retrieve and recite the weather in response to determining that the user spoke the keyword followed by a word associated with an API of the voice capable device for searching the weather.

In some embodiments, the voice control application may, in response to determining that the utterance of the first plurality of utterances does not match the utterance of the second plurality of utterances, prompt the user (e.g., user 110 via speaker 108) to confirm the triggering of the voice capable user device. For example, the voice control application may determine that when the user does not speak an utterance associated with an API of the voice activated device that the device may have been accidentally triggered (e.g., because maybe the user was just talking about an OK cellphone and not trying to say "OK cellphone" to activate the voice device). For example, the voice control application may prompt the user to ask whether the user intended to trigger the voice capable device.

In some embodiments, the voice control application may receive a second voice input from the user in response to the prompting. For example, the voice control application may detect at microphone 104 of voice activated device 106 a voice input in response to the prompting from one of user 110 or user 114. The voice control application may convert the voice input to text and may determine whether the second voice input confirms the triggering of the voice capable device. For example, the voice control application may determine whether the second voice input received via microphone 104 comprises a "Yes," "yeah," or "OK" in response to the prompt "Did you want to activate the device?"

In some embodiments, in response to determining that the second voice input does not confirm the triggering of the voice capable device, the voice control application may determine a cadence associated with the first voice input and may update the cadence stored in the user profile based on the cadence. For example, when the voice control application determines that the voice capable device was inadvertently activated, it may update a cadence associated with the user's normal speaking cadence to further refine how the voice control application determines whether the speaking cadence of the user corresponds to activating the user device or not.

Figure 2:
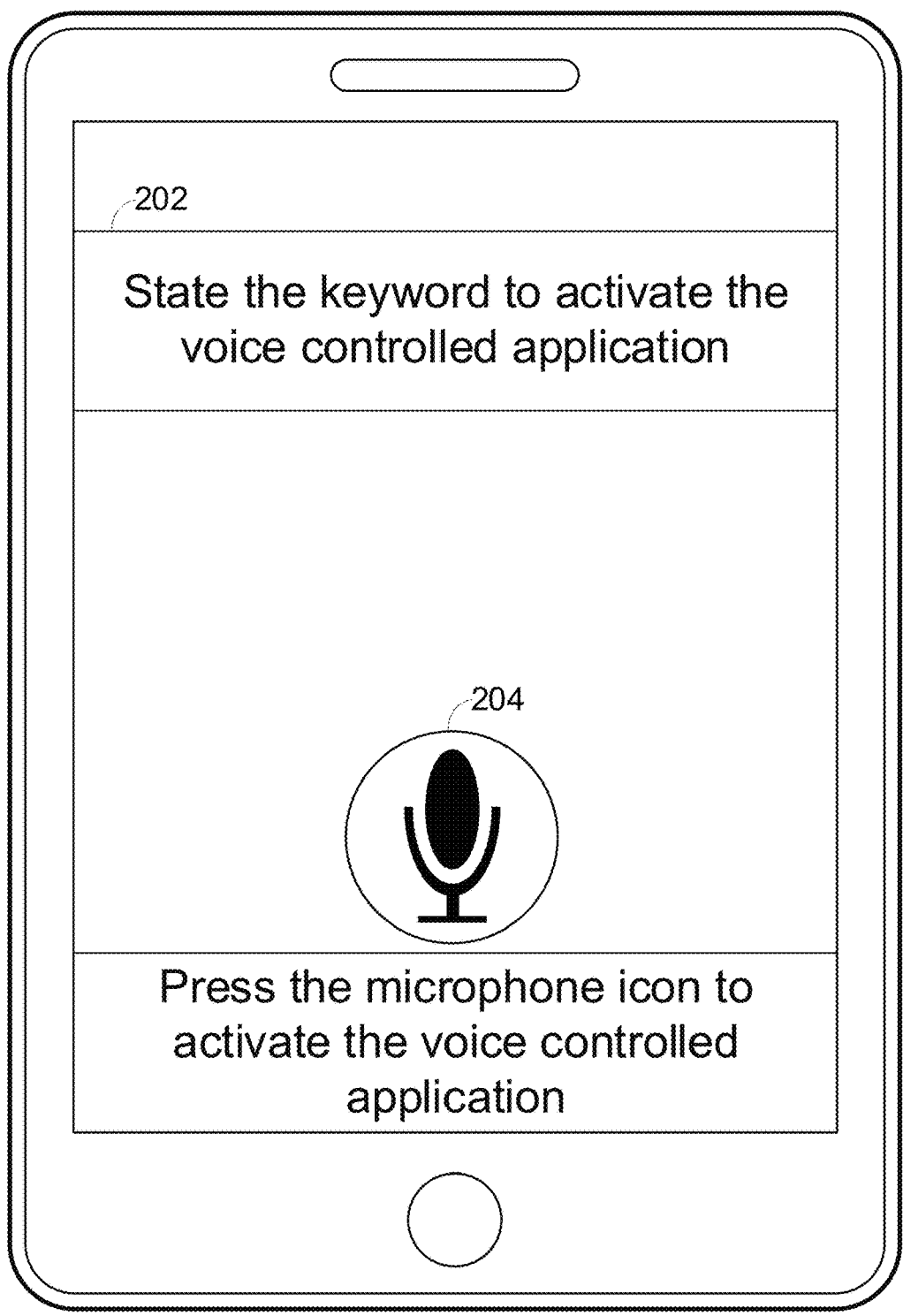
FIG. 2 shows an illustrative example of a voice control application display that may be presented, in accordance with some embodiments of the disclosure.

FIG. 2 shows an illustrative display screen of a voice control application implemented on a user device (e.g., a user tablet computer). Device 200 is depicted having a display that includes an exemplary interface for a voice control application. The voice control application running on device 200 is depicted having multiple methods for triggering the voice control application. For example, a user may trigger an always listening component of the voice control application by speaking the keyword (e.g., "Tom") as indicated by prompt 202. Although prompt 202 is depicted as a textual prompt on device 200, prompt 202 may be indicated to a user audibly (e.g., by having voice control application recite the text of prompt 202 using a text to speech algorithm and outputting the speech via a speaker of device 202). In another example, prompt 202 may not be displayed or recited by the voice control application. For example, the always listing component of the voice control application may await an audible voice input comprising the keyword "Tom" regardless of whether the user was presented with prompt 202. In some embodiments, the voice control application may analyze a speaking cadence received by a user to determine whether an input comprising the keyword was intended to trigger the voice control device as discussed above and below.

In some embodiments, the voice control application may generate for display an interface button to activate a listening component of the voice control application. For example, the voice control application monitor touch screen inputs associated with device 200 and may determine whether a touch input corresponds to a user selection of button 204. When the voice control application determines that the touch input corresponds to button 204, the voice control application may trigger a listening function of the voice control application and may begin storing, at least temporarily, audio received via a microphone of device 200. The voice control application may compare the received voice input to a plurality of voice commands associated with various functions corresponding to the voice control application (e.g., a function to schedule a calendar invite, to search for media, etc.) and may trigger a function corresponding to the received audio input.

Figure 3:
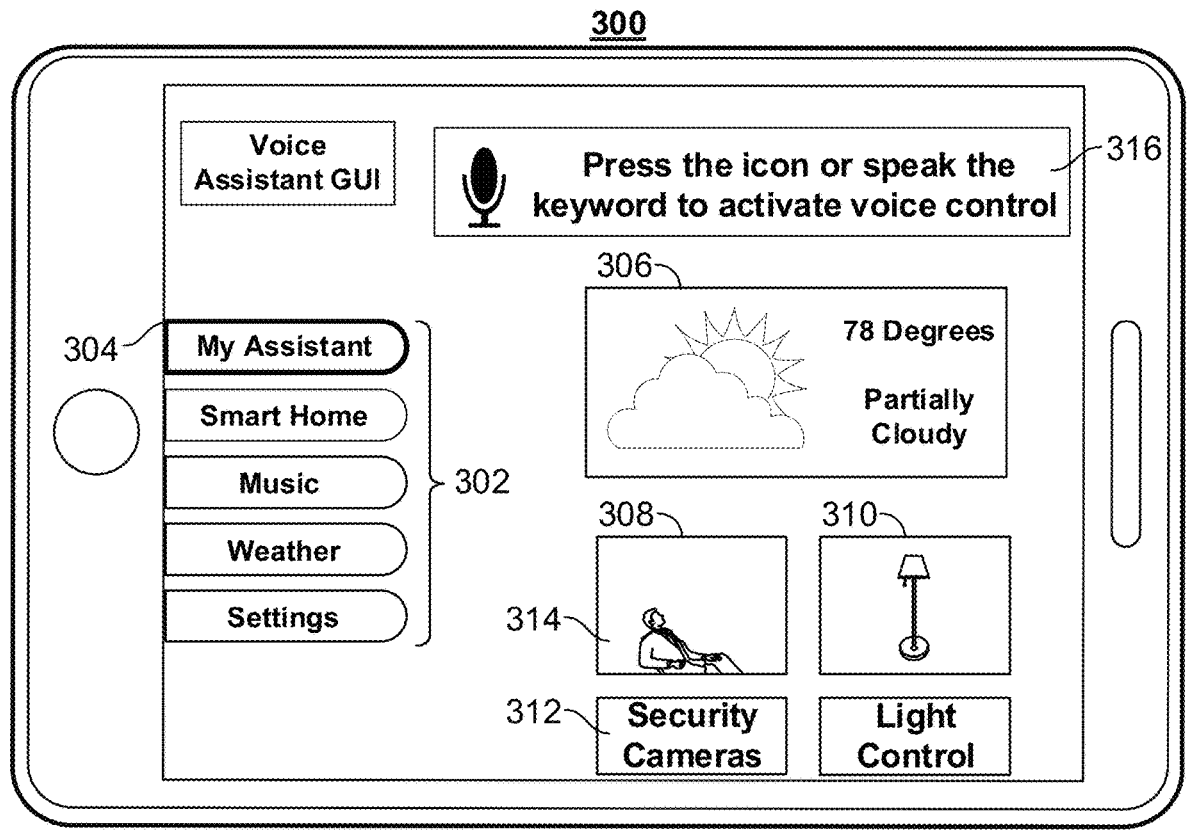
FIG. 3 shows an illustrative example of a display associated with a voice control application that may be presented, in accordance with some embodiments of the disclosure.

FIG. 3 depicts an exemplary voice control application associated with a voice assistant application. In some implementations, the features and functions described above and below with respect to determining whether to trigger a voice control application may be implemented by a voice assistant application. Display 300 includes an exemplary voice assistant interface that includes selectable options 302 for accessing information, applications, and/or other features associated with a the user or voice control application. In display 300, my assistant option 304 is selected, thus providing listings 306, 308, and 310, which in some embodiments include information that is personalized based on the user profile (e.g., based on devices in the user's smart home). In some implementations, the graphical interface may supplement audio output by the voice assistant and may be display directly or indirectly in response receiving a voice query from a user comprising the keyword.

The voice control application may be personalized based on a user's preferences. A personalized voice control application allows a user to customize displays and features to create a personalized "experience" with the voice control application. This personalized experience may be created by allowing a user to input these customizations by the voice control application and/or by monitoring user activity to determine various user preferences.

Users may access a personalized voice control application by logging in or otherwise identifying themselves to the voice control application (e.g., based on the voice control application verifying a voice signature associated with the user or by logging in using a GUI associated with the voice control application). Customization of the voice control application may be made in accordance with a user profile. The customizations may include varying presentation schemes of information (e.g., color scheme of displays, font size of text, etc. of a GUI associated with the voice control application or audible recitation of information from the voice control application), aspects of content displayed or dictated to the user by the voice control application, customizations of the transcription and interpretation of the user's voice input (e.g., if the user talks with a lisp the voice control application may interpret a voice input for the user with the lisp differently than for a user without a lisp) and other desired customizations.

The voice control application may allow a user to provide user profile information or may automatically compile user profile information. The voice control application may, for example, monitor the content the user accesses and/or other interactions the user may have with the voice control application. For example, the voice control application may monitor a user's voice input and may compare the voice input against a standard voice input for the user's region and language and may identify unique attributes of the user's voice.

Additionally, the voice control application may obtain all or part of other user profiles that are related to a particular user (e.g., from other web sites on the Internet the user accesses, such as a social network of the user, from other applications and/or voice applications the user accesses, from a handheld device of the user, etc.), and/or obtain information about the user from other sources that the voice control application may access. As a result, a user can be provided with a unified experience across the user's different devices or may compile a user history based on the user actions from a plurality of locations.

In some embodiments, the voice control application may generate a voice model for the user based on the user profile data. For example, the voice control application may monitor a user's voice and speaking and, based on the monitoring, may construct a model of how the user pronounces words, a speed at which the user speaks, sounds that are accentuated by the user, etc. Based on the constructed speaking model, the system may determine whether the user is speaking to another human or to the voice assistant. For example, the system may determine, based on the speaking cadence of the user, whether the user is speaking to a human or to a computerized voice assistant.

FIG. 4 depicts an exemplary interaction between a user an exemplary voice control application. In some embodiments, the voice control application may identify a speaking cadence for the user, receive a voice input from the user, and determine whether the received voice input is intended to activate the voice control application based on the speaking cadence and the presence of a keyword in the voice input. For example, the voice control application may determine that the keyword for activating the voice control application is "Tom" (e.g., based on receiving a plurality of settings associated with the voice control application from memory).

The voice control application may receive, from a profile of the user, a speaking cadence. For example, the voice control application may receive, from the profile of the user, a first value indicating an amount of time that the user typically pauses when speaking the name "Tom" when addressing a person and may receive, from the profile of the user, a second value indicating an amount of time that the user typically pauses when speaking the name "Tom" when addressing the device named "Tom."

FIG. 4 depicts exemplary users 402 and 410 speaking prompts in the presence of user devices 404 and 412. In some embodiments, the voice control application may be implemented at least in part on user devices 404 and 412. In the exemplary embodiment, user 402 may speak prompt 406 "Tom, do I have mail" to ask another person whether user 402 received any physical mail. User device 404 may detect prompt 406 via a microphone of user device 404 and may determine whether the keyword "Tom" is present in prompt 406. In response to determining that the keyword "Tom" is present in prompt 406 (e.g., the first word of the prompt) the voice control application running on user device 404 may identify an duration of a pause between the keyword (e.g., "Tom") and the remainder of prompt 406 (e.g., "Do I have mail"). For example, the voice control application may determine that the user pauses for a duration of $\Delta t_o$ (e.g., 0.5 seconds) between the keyword and the reminder of the prompt. The voice control application may compare the duration $\Delta t_o$ to a speaking cadence for the user and may determine whether the duration $\Delta t_o$ most closely approximates a speaking cadence of the user when the user is speaking to another human vs when the user is speaking to the voice control application. For example, the voice control application may compare $\Delta t_o$ (e.g., 0.5 seconds) to a first speaking cadence of the user (e.g., pause between words) when the user is speaking to another human (e.g., 0.4 seconds) to a second speaking cadence when the user is speaking to a voice assistant (e.g., 0.75 seconds). The voice control application may determine that a difference between $\Delta t_o$ and the first speaking cadence (e.g., 0.1) is smaller than the difference between $\Delta t_o$ and the second speaking cadence (e.g., 0.25) and accordingly may determine that the user is speaking to another human and not the voice control application. Accordingly, the voice control application may not respond to prompt 406 as the voice control application determined, based on the speaking cadence, that the user intends to speak to another human and not the voice control application.

In some embodiments a user, such as user 410, may speak a prompt directed at the voice control application (e.g., prompt 406). The voice control application (e.g., a voice control application running on user device 412) may detect the prompt, determine whether the prompt comprises a keyword used to activate the voice control application (e.g., "Tom"), and may analyze the prompt to determine, based on a speaking cadence of the user, whether the user intended to activate the voice control application. For example, user device 412 associated with the voice control application may detect prompt 406 "Tom, do I have mail?" and may determine an amount of time that the user paused between the keyword "Tom" and the remainder of the prompt. For example, the voice control application may determine that the user paused for a duration of $\Delta t_1$ (e.g., 0.8 seconds) and may compare the duration $\Delta t_1$ to a speaking cadence for the user when the user is addressing the voice control application. For example, the voice control application may determine that the user typical pauses for 0.75 seconds after speaking a keyword before proceeding to recite the remainder of the prompt. The voice control application may determine that a difference between the typical speaking cadence (e.g., 0.75 seconds) and the detected speaking cadence (e.g., 0.8) is within a predetermined difference (e.g., 0.1) and therefore the user intended for prompt 406 to address the voice control application. Accordingly, the voice control application may activate a module within the voice control application to process the remainder of prompt 406 (e.g., "Do I have mail?") and provide a response based on the remainder of the prompt. For example, the voice control application may output notification 408 via a speaker of user device 412 to notify the user that the voice control application is activated and is checking the user's electronic mail.

Users may access content, information, the voice control application (and its display screens and audio prompts described above and below) from one or more of their user equipment devices. FIG. 5 shows a generalized embodiment of illustrative user equipment device 102, 104, 106, 108, 200, 404, 408 and the devices depicting display 300 connected with a remote server. More specific implementations of user equipment devices are discussed below in connection with FIG. 6. System 500 is depicted having user equipment 532 (e.g., a user's voice assistant) connected to remote equipment 530 (e.g., a server) via network 534. User equipment 532 may be connected to network 534 via a wired or wireless connection and may receive content and data via input/output (hereinafter "I/O") path 502. Remote equipment 530 may be connected to network 534 via a wired or wireless connection and may receive content and data via I/O path 522. I/O path 502 and/or I/O path 522 may provide content (e.g., broadcast programming, on-demand programming, Internet content, and other video, audio, or information) and data to control circuitry 504 and/or remote control circuitry 524, which includes processing circuitry 506 and storage 508, and/or remote processing circuitry 526 and remote storage 528. Control circuitry 504 may be used to send and receive commands, requests, and other suitable data using I/O path 502. I/O path 502 may connect control circuitry 504 (and specifically processing circuitry 506) to one or more communications paths (described below). Likewise, remote control circuitry 524 may be used to send and receive commands, requests, and other suitable data using I/O path 522. I/O functions may be provided by one or more of these communications paths, but are shown as a single path in FIG. 5 to avoid overcomplicating the drawing.

Control circuitry 504 and remote control circuitry 524 may be based on any suitable processing circuitry 506 such as processing circuitry based on one or more microprocessors, microcontrollers, digital signal processors, programmable logic devices, etc. In some embodiments, control circuitry 504 executes instructions for a voice control application (e.g., local voice processing module 518) stored in memory (i.e., storage 508). In client-server based embodiments, control circuitry 504 may include communications circuitry suitable for communicating with a voice application server or other networks or servers (e.g., remote device 530). For example, the voice control application may include a first module (e.g., local voice processing module 518) on user equipment 532 and may communicate via I/O path 502 over network 534 to remote equipment 530 associated with a second module of the voice control application (e.g., remote voice processing module 520). With our without user input, the voice control application may coordinate communication over communications circuitry between local voice processing module 518 and remote voice processing module 520 to execute voice commands issued by a user. Communications circuitry may include a modem or other circuitry for connecting to a wired or wireless local or remote communications network. Such communications may involve the Internet or any other suitable communications networks or paths (which is described in more detail in connection with FIG. 6). In addition, communications circuitry may include circuitry that enables peer-to-peer communication of user equipment devices (e.g., WiFi-Direct®, Bluetooth®, etc.), or communication of user equipment devices in locations remote from each other.

Memory (e.g., random-access memory, read-only memory, or any other suitable memory), hard drives, optical drives, or any other suitable fixed or removable storage devices may be provided as storage 508 and/or remote storage 528. Storage 508 and/or remote storage 528 may include one or more of the above types of storage devices. Storage 508 and/or remote storage 528 may be used to store various types of content described herein and voice control application data, including program information, guidance application and/or voice control application settings, user preferences or profile information, or other data used in operating the guidance application and/or voice control application (e.g., local voice processing module 518 and/or remote voice processing module 520). Nonvolatile memory may also be used (e.g., to launch a boot-up routine and other instructions). Though local voice processing module 518 and remote voice processing module and depicted as modules in storage in storage 508 and remote storage 528, respectively, voice processing modules 518 and 520 may include additional hardware or software that may not be included in storages 508 and 528. For example, local voice processing module 518 may include hardware, and firmware associated with the hardware, for accelerating the processing and detection of keywords uttered by the user.

A user may control the control circuitry 504 using user input interface 510. User input interface 510 may be any suitable user interface, such as a remote control, mouse, trackball, keypad, keyboard, touch screen, touch pad, stylus input, joystick, microphone, voice recognition interface, or other user input interfaces. Display 512 may be provided as a stand-alone device or integrated with other elements of user equipment device 500. Display 512 may be one or more of a monitor, a television, a liquid crystal display (LCD) for a mobile device, or any other suitable equipment for displaying visual images. Speakers 514 may be provided as integrated with other elements of user equipment device 500 or may be stand-alone units. The audio prompts of the voice control application may be played through speakers 514. In some embodiments, the audio may be distributed to a receiver (not shown), which processes and outputs the audio via speakers 514.

The voice control application may be implemented using any suitable architecture. For example, it may be a stand-alone application wholly implemented on user equipment 532. In such an approach, instructions of the application are stored locally (e.g., local voice processing module 518), and data for use by the application is downloaded on a periodic basis (e.g., a network connection, or using another suitable approach). In another embodiment, the voice control application is a client-server based application. Data for use by a thick or thin client implemented on user equipment device 532 may be retrieved on-demand by issuing requests to a server (e.g., remote device 530) remote to the user equipment 532. In one example of a client-server based application, control circuitry 504 runs a web browser that interprets web pages provided by a remote server.

In some embodiments, the voice control application may include a plurality of modules implemented on a plurality of devices (e.g., user equipment 532 and remote device 530) to execute the features and functionalities of the voice control application. The voice control application may be configured such that features of the voice control application that require processing capabilities beyond that of user equipment 532 are performed on a server associated with the voice control application (e.g., remote equipment 530) while other capabilities of the voice control application are performed on user equipment 532. For example, a voice control application may comprise a first module (e.g., local voice processing module) implemented on user equipment 532 that detects when a user speaks to the device and may perform preliminary processing on the sound input to determine whether the user spoke a keyword associated with the device. The voice control application may comprise a second module (e.g., remote voice processing module 520) implemented on a second device (e.g., remote device 530) for performing additional processing on the sound input, such as verifying that the keyword was spoken by the user and extracting any additional commands that may have been included in the voice input.

Though exemplary system 500 is depicted having two devices implementing two modules of the voice control application, any number of modules or devices may be used. An exemplary voice control application may comprise a plurality of modules for detecting and processing the voice input from a user, such as a first module for detecting sound input, a second module for detecting a keyword in the sound input, a third module for verifying whether the keyword was spoken, and a fourth module for processing additional voice input from the user in the sound input. The exemplary voice control application may be implemented across a plurality of devices. For example, a voice assistant device (e.g., a standalone device that executes voice commands spoken by a user or an application running on an operating system of user equipment, such as a tablet) may execute the first module for detecting the sound input and may transmit the sound input to the second module to detect a keyword in the sound input. In response to detecting the keyword by the second module, the voice assistant device may transmit the voice input to a second device (e.g., a server located remote to the voice assistant device that has greater sound analysis capabilities than the voice assistant device) that is associated with the third module for verifying whether a keyword is included in the voice input. In response to verifying that the keyword is included in the voice input input, the server may process the voice input to detect any additional voice commands in the voice input. Though the voice control application is discussed in relation to control circuitry 504 running on a user device (e.g., user equipment 532) it should be understood that any of the features and functionalities of the voice control application may be split across multiple modules running on any control circuitry, such as control circuitry 508 local to a user device or control circuitry remote to the user device (e.g., remote control circuitry 524).

Figure 5:
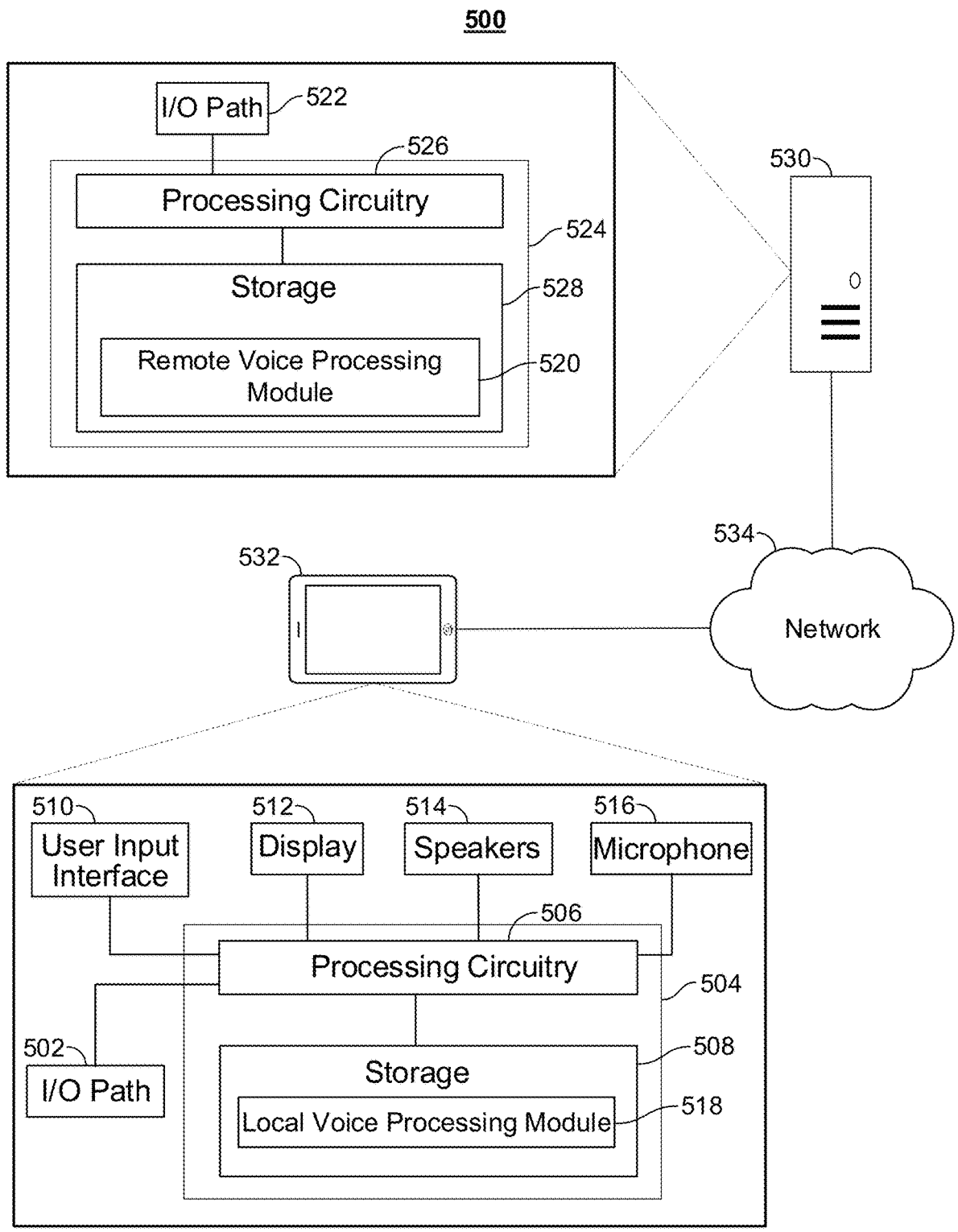
FIG. 5 is a block diagram of an illustrative system, in accordance with some embodiments of the disclosure.
Figure 6:
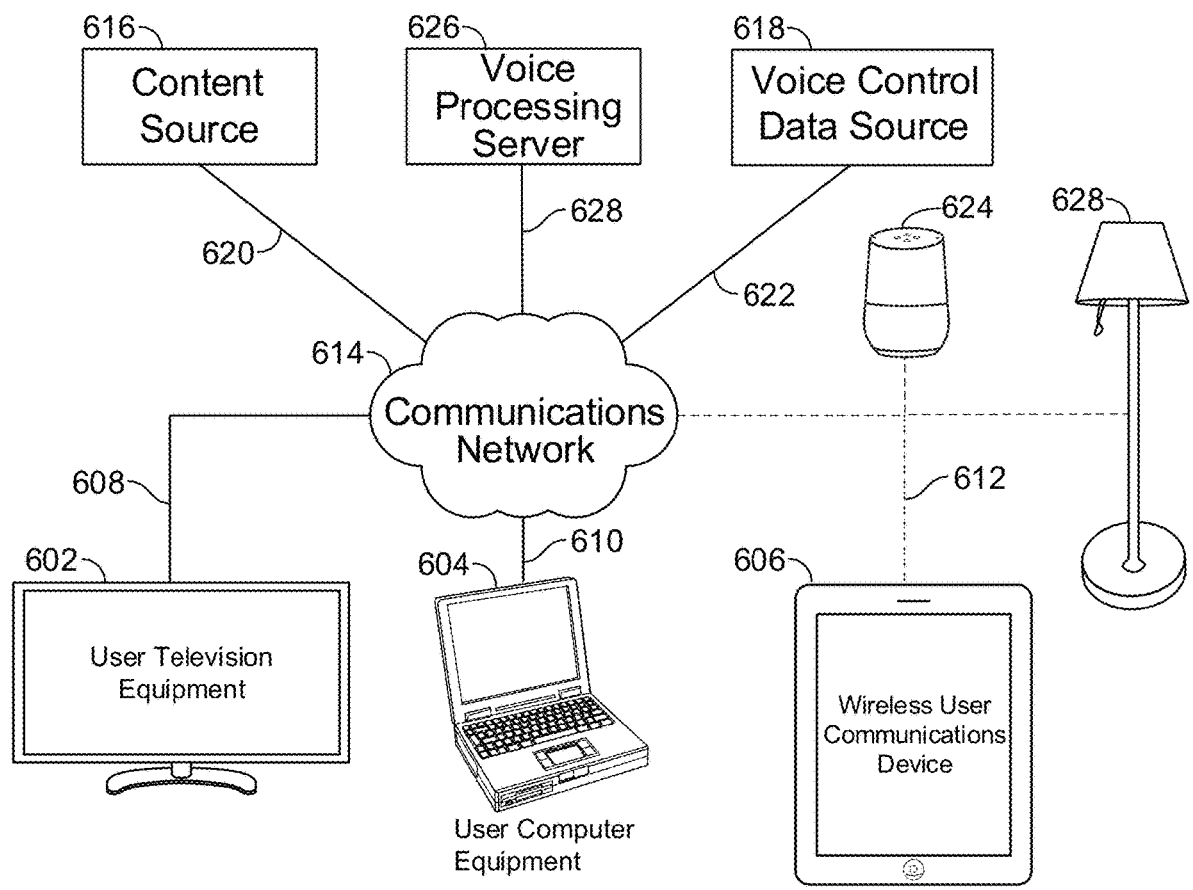
FIG. 6 is another block diagram of an illustrative system, in accordance with some embodiments of the disclosure.

System 500 of FIG. 5 can be implemented in system 600 of FIG. 6 as user television equipment 602, user computer equipment 604, wireless user communications device 606, voice control device 624, IOT device 628, or any other type of user equipment suitable for interfacing with the voice control application. For simplicity, these devices may be referred to herein collectively as user equipment or user equipment devices. User equipment devices, on which an application is at least partially implemented, may function as a standalone device or may be part of a network of devices (e.g., each device may comprise an individual module of the voice control application). Various network configurations of devices may be implemented and are discussed in more detail below.

User television equipment 602 may include a set-top box, an integrated receiver decoder (IRD) for handling satellite television, a television set, a digital storage device, a DVD recorder, a local media server, or other user television equipment. One or more of these devices may be integrated to be a single device, if desired. User computer equipment 604 may include a PC, a laptop, a tablet, a personal computer television (PC/TV), a PC media server, a PC media center, or other user computer equipment. Wireless user communications device 606 may include a mobile telephone, a portable video player, a portable music player, a portable gaming machine, a wireless remote control, or other wireless devices. Voice control device 624 may include a smart speaker, a standalone voice assistant, smarthome hub, etc. IOT device 628 may include any of a plurality of devices in a user's home, such as a light controller, washing machine, security camera, etc.

It should be noted that the lines have become blurred when trying to classify a device as one of the above devices. In fact, each of user television equipment 602, user computer equipment 604, wireless user communications device 606, voice control device 624, and IOT device 628 may utilize at least some of the system features described above in connection with FIG. 5 and, as a result, include some or all of the features of the voice control application described herein. For example, user television equipment 602 may implement a voice control application that is activated upon detecting a voice input comprising a keyword. The voice control application may also have the same layout on the various different types of user equipment or may be tailored to the display capabilities of the user equipment. For example, on user computer equipment 604, the voice control application may be provided in a visual layout where the voice control application may recite audio prompts of the voice control application. In another example, the voice control application may be scaled down for wireless user communications devices. In another example, the voice control application may not provide a GUI and may listen to and dictate audio to a user such as for voice control device 624 or IOT device 628, which, in some instances, may not comprise a display.

In system 500, there is typically more than one of each type of user equipment device, but only one of each is shown in FIG. 6 to avoid overcomplicating the drawing. In addition, each user may utilize more than one type of user equipment device (e.g., a user may have a television set and a computer) and also more than one of each type of user equipment device (e.g., a user may have a voice control device and a mobile telephone and/or multiple IOT devices).

The user may also set various settings to maintain consistent settings across in-home devices and remote devices. For example, if a user sets a weather location on their personal computer at their office on their voice control application, the same weather location would appear on the voice control application in the user's in-home devices (e.g., user television equipment and user computer equipment) as well as the user's mobile devices, if desired. Therefore, changes made on one user equipment device can change the experience on another user equipment device, regardless of whether they are the same or a different type of user equipment device. In addition, the changes made may be based on settings input by a user, as well as user activity monitored by the voice control application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile device (e.g., iPhone) network, cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well other short-range point-to-point communication paths, wireless paths (e.g., Bluetooth®, infrared, IEEE 902-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616, voice control data source 618, and voice processing server 626 coupled to communications network 614 via communication paths 620, 622, and 628, respectively. Paths 620, 622, 628 may include any of the communication paths described above in connection with paths 608, 610, and 612. Communications with the content source 616 and voice control data source 618 may be exchanged over one or more communications paths, but are shown as a single path in FIG. 6 to avoid overcomplicating the drawing. In addition, there may be more than one of each of content source 616 and voice control data source 618, but only one of each is shown in FIG. 6 to avoid overcomplicating the drawing. (The different types of each of these sources are discussed below.) If desired, content source 616 and voice control data source 618 may be integrated as one source device. Although communications between sources 616 and 618 with user equipment devices 602, 604, 606, 624, and 628 are shown as through communications network 614, in some embodiments, sources 616 and 618 may communicate directly with user equipment devices 602, 604, 606, 624, and 628 via communication paths (not shown) such as those described above in connection with paths 608, 610, and 512.

Content source 616 may store or index a plurality of data used for responding to user prompts received by the voice control application. In some embodiments, content source 616 may index the location of content located on servers located remotely or local to content source 616. In response to receiving a voice query, the voice control application may access the index stored on content source 616 and may identify a server (e.g., a database stored on a server) comprising the information to respond to the user's query. For example, the voice control application may receive a voice query requesting the weather forecast. In response to receiving the query, the voice control application may search content source 616 for a website that contains weather information, may access the website for the weather information, and may audibly recite the weather information to the user.

Voice control data source 618 may provide data used during the operation or function of the voice control application. For example, voice control data source 618 may store user profile information, information about the speaking cadence of the user, lists of keywords and functions associated with the voice control application, etc. In some embodiments, updates for the voice control application may be downloaded via voice control data source 618.

The voice control application may be, for example, a stand-alone application implemented on user equipment devices. In other embodiments, voice control application may be a client-server application where only the client resides on the user equipment device. For example, the voice control application may be implemented partially as a client application on control circuitry 604 of devices 602, 604, 606, 624, and/or 628 and partially on a remote server as a server application (e.g., voice control data source 618, content source 616, or voice processing server 626). The guidance application displays and/or voice control application displays may be generated by the voice control data source 618, content source 616, voice processing server 626 and transmitted to the user equipment devices. The voice control data source 618, content source 616, and voice processing server 626 may also transmit data for storage on the user equipment, which then generates the voice control application displays and audio based on instructions processed by control circuitry.

System 600 is intended to illustrate a number of approaches, or configurations, by which user equipment devices and sources and servers may communicate with each other. The present invention may be applied in any one or a subset of these approaches, or in a system employing other approaches for delivering and providing a voice control application.

FIG. 7 is a flowchart of illustrative steps for avoiding inadvertently triggering a voice assistant based on a speaking cadence of a user, in accordance with some embodiments of the disclosure. For example, a voice control application implementing process 700 may be executed by control circuitry 504. In some embodiments, instructions for executing process 700 may be encoded onto a non-transitory storage medium (e.g., storage 508) as a set of instructions to be decoded and executed by processing circuitry (e.g., processing circuitry 506). Processing circuitry may, in turn, provide instructions to other sub-circuits contained within control circuitry 504, such as the tuning, video generating, encoding, decoding, encrypting, decrypting, scaling, analog/digital conversion circuitry, and the like. It should be noted that process 700, or any step thereof, could be performed on, or provided by, any of the devices shown in FIGS. 1-2 and 4-6.

Process 700 begins at 702, where the voice control application (e.g., via control circuitry 504) detects an utterance that includes a keyword that is used to activate a voice assistant. For example, control circuitry 504 may detect an audio input from microphone 104 via user input interface 510. At 704, control circuitry 504 determines, from the utterance, a first period of time between a word spoken immediately prior to the keyword and a second period of time between the keyword and a word spoken immediately after the keyword. For example, control circuitry 504 may analyze an audio waveform corresponding to the audio input received via microphone 104 and may identify periods in the audio waveform where an audio signal is at a local minimum and may identify those portions of the audio signal as a period between words. Control circuitry 504 may utilize a voice to text algorithm to identify a portion of the audio waveform corresponding to the keyword and may identify the period before and after the keyword.

At 706, control circuitry 504 retrieves information about a speaker of the utterance, the information comprising a speaking cadence for the speaker. For example, control circuitry 504 may identify user 110 or user 114 and may transmit a unique identifier for user 110 or user 114 to a database (e.g., voice control data source 618 via communications network 614 or storage 508) and may, in response to transmitting the query, receive a response including a profile for the user. Control circuitry 504 may retrieve from the profile, a cadence associated with the user.

At 708, control circuitry 504 activates the voice assistant in response to determining that at least one of the first period of time and the second period of time differs from the speaking cadence for more than a threshold amount. For example, control circuitry 504 may retrieve a threshold amount from voice control data source 618 via communications network 614 or storage 508 indicating a period of silence before control circuitry 504 may determine that the user is speaking with a voice controlled device (e.g., voice activated device 106 or voice assistant 102). When control circuitry 504 determines the period is differs by greater than the threshold (e.g., the user paused longer than is normal for the user's speaking cadence) the system will activate the voice assistant (e.g., voice assistant 102 or voice activated device 106).

At 710, control circuitry 504 refrains from activating the voice assistant in response to determining that neither of the first period of time and the second period of time differs from the speaking cadence for more than a threshold amount. For example, in contrast, when the speaking cadence of the user is within the threshold amount, control circuitry 504 may determine that the user is having a conversation with another user (e.g., a conversation between user 110 and user 114) and may accordingly refrain from activating the voice assistant (e.g., voice activated device 106 or voice assistant 102).

It is contemplated that the steps or descriptions of FIG. 7 may be used with any other embodiment of this disclosure. In addition, the descriptions described in relation to the algorithm of FIG. 7 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 7 may be implemented on a combination of appropriately configured software and hardware, and that any of the devices or equipment discussed in relation to FIGS. 1-2 and 4-6 could be used to implement one or more portions of the process.

Figure 8:
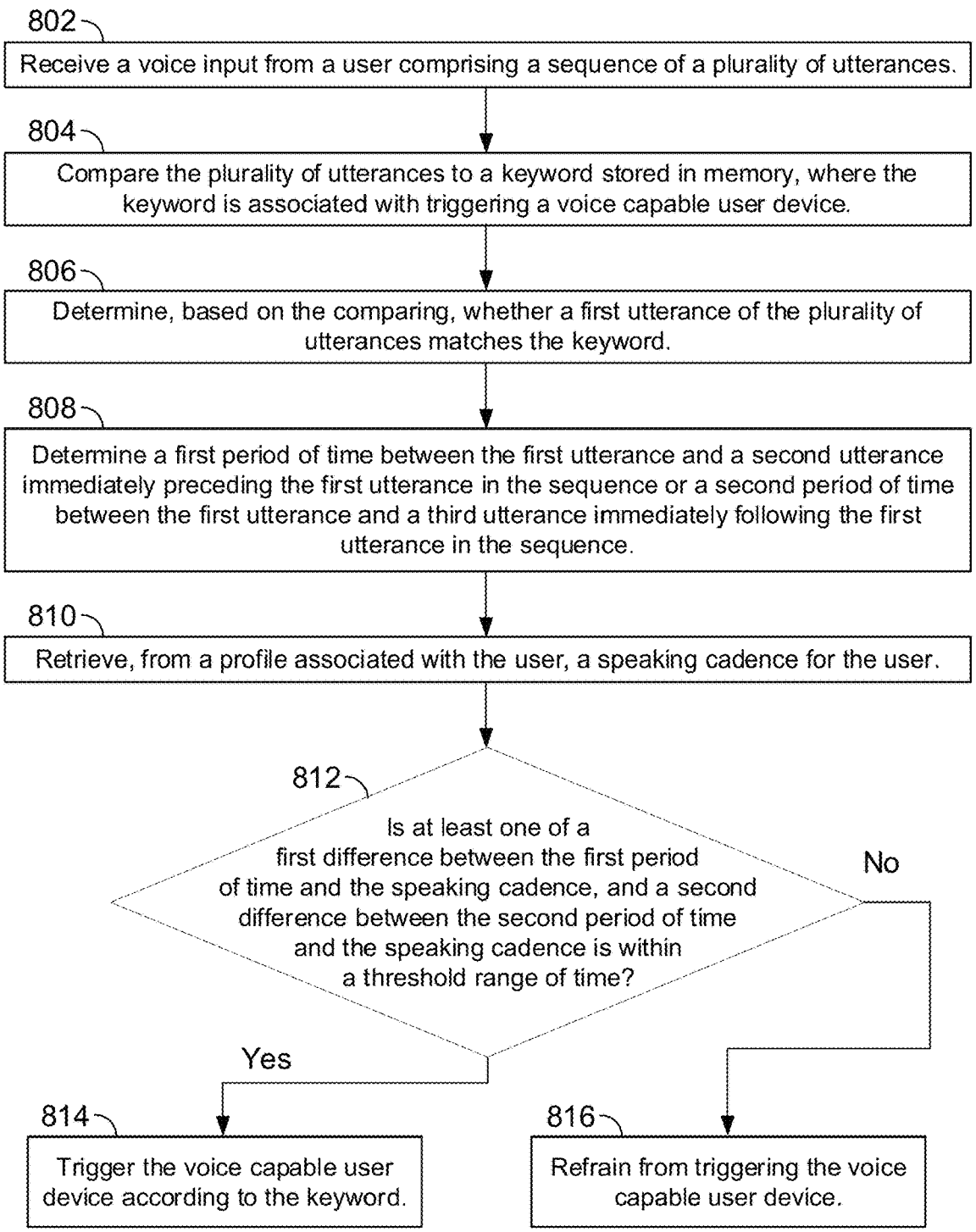
FIG. 8 depicts another illustrative process for avoiding inadvertently trigging a voice capable device based on a speaking cadence of the user, in accordance with some embodiments of this disclosure.

FIG. 8 is a flowchart of illustrative steps for or avoiding inadvertently triggering a voice assistant based on speaking cadence of a user, in accordance with some embodiments of the disclosure. For example, a voice control application implementing process 800 may be executed by control circuitry 504. In some embodiments, instructions for executing process 800 may be encoded onto a non-transitory storage medium (e.g., storage 508) as a set of instructions to be decoded and executed by processing circuitry (e.g., processing circuitry 506). Processing circuitry may, in turn, provide instructions to other sub-circuits contained within control circuitry 504, such as the tuning, video generating, encoding, decoding, encrypting, decrypting, scaling, analog/digital conversion circuitry, and the like. It should be noted that process 800, or any step thereof, could be performed on, or provided by, any of the devices shown in FIGS. 1-2 and 4-6.

Process 800 begins at 802 where control circuitry 504 receives a voice input from a user comprising a sequence of a plurality of utterances. For example, as discussed above, control circuitry 504 may receive via microphone 104 a sequence of utterances (e.g., speech 112 or speech 116) from user 110 or user 114).

At 804, control circuitry 504 compares the plurality of utterances to a keyword stored in memory, where the keyword is associated with triggering a voice capable user device. For example, control circuitry 504 may retrieve a keyword from storage 508 and may compare a transcription of the voice input to the keyword retrieved from storage 508.

At 806, control circuitry 504 determines, based on the comparing, whether a first utterance of the plurality of utterances matches the keyword. For example, control circuitry 504 may transcribe the plurality of utterances to textual words and store those words at least temporarily in storage 508. Control circuitry 504 may retrieve a textual word from storage 508 and may compare the word to the keyword.

At 808, control circuitry 504 determines a first period of time between the first utterance and a second utterance immediately preceding the first utterance in the sequence or a second period of time between the first utterance and a third utterance immediately following the first utterance in the sequence. For example, as discussed above, control circuitry 504 may analyze a sound signal received via microphone 104 over user input interface 510 and may detect periods of silence delimiting words in the voice input (e.g., periods where the noise is below a threshold noise level for household 100). Based on the detected periods of silence and a location of the detected spoken keyword in the soundwave, control circuitry 504 may identify the periods of silence immediately preceding and immediately following the identified location of the keyword as the first and second period of time.

At 810, control circuitry 504 retrieves, from a profile associated with the user, a speaking cadence for the user. For example, control circuitry 504 may identify one of user 110 or user 114 and may retrieve a profile associated with user 110 or user 114 from a database of voice control data source 618 via communications network 614 or storage 508 by transmitting a unique identifier to the database. In response to transmitting the unique identifier, control circuitry 504 may retrieve a profile of the user comprising the cadence.

At 812, control circuitry 504 determines whether at least one of a first difference between the first period of time and the speaking cadence, and a second difference between the second period of time and the speaking cadence is within a threshold range of time. For example, control circuitry 504 may determine a threshold range of time based off of the speaking cadence for the user. For example, control circuitry 504 may determine that when the user is issuing commands to a voice assistant (e.g., voice assistant 102 or voice activated device 106) that the user pauses for 1.5 seconds after reciting the keyword. Accordingly, control circuitry 504 may determine whether either of the periods is similar to the cadence (e.g., within 0.2 seconds of 1.5 based on a computed variance of the user's typical pause after reciting the keyword). If one of the first and second period is within the threshold range, control circuitry 504 proceeds to 814 where control circuitry 504 triggers the voice capable user device according to the keyword. For example, control circuitry 504 may determine an action to perform based on mapping the keyword to an API associated with the voice capable user device and may perform the mapped function. If control circuitry 504 determines that neither of the first and second period is within the threshold range, control circuitry 504 proceeds to 816 where control circuitry 504 refrains from triggering the voice capable user device. For example, control circuitry 504 may determine that when the first and second period is not within the threshold range that the user is merely having a conversation and does not intend to activate the voice activated user device.

It is contemplated that the steps or descriptions of FIG. 8 may be used with any other embodiment of this disclosure. In addition, the descriptions described in relation to the algorithm of FIG. 8 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 8 may be implemented on a combination of appropriately configured software and hardware, and that any of the devices or equipment discussed in relation to FIGS. 1-2 and 4-6 could be used to implement one or more portions of the process.

Figure 9:
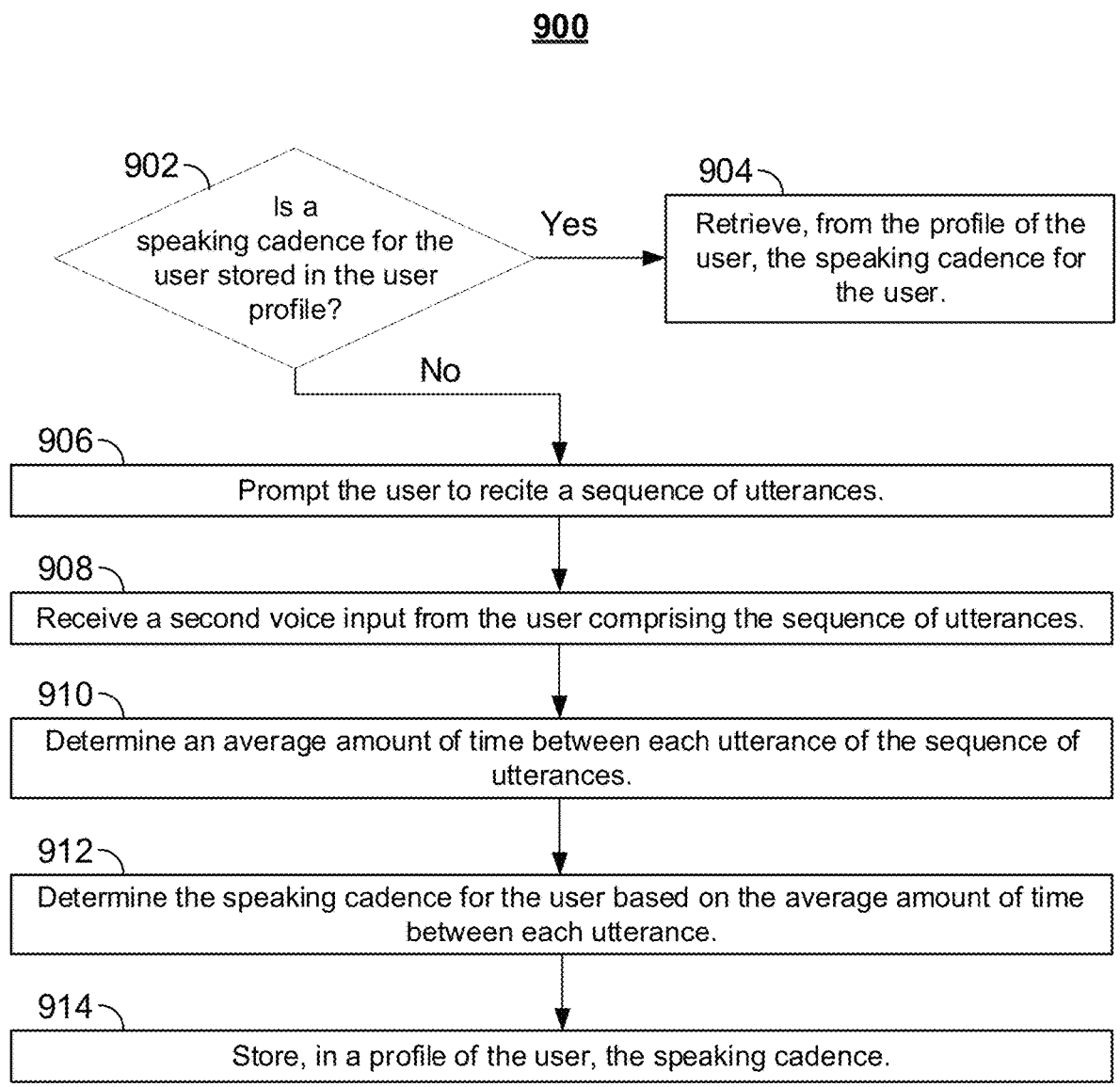
FIG. 9 depicts an illustrative process for updating speaking cadence for a user based on a voice input, in accordance with some embodiments of this disclosure.

FIG. 9 is a flowchart of illustrative steps for updating speaking cadence for a user based on a voice input in accordance with some embodiments of the disclosure. For example, a voice control application implementing process 900 may be executed by control circuitry 504. In some embodiments, instructions for executing process 900 may be encoded onto a non-transitory storage medium (e.g., storage 508) as a set of instructions to be decoded and executed by processing circuitry (e.g., processing circuitry 506). Processing circuitry may, in turn, provide instructions to other sub-circuits contained within control circuitry 504, such as the tuning, video generating, encoding, decoding, encrypting, decrypting, scaling, analog/digital conversion circuitry, and the like. It should be noted that process 900, or any step thereof, could be performed on, or provided by, any of the devices shown in FIGS. 4-5.

Process 900 begins at 902 where control circuitry 504 determines whether there is a speaking cadence for the user stored in the profile. For example, control circuitry 504 may identify one of user 110 or user 114 and may retrieve a profile for one of the users. Control circuitry 504 may determine, based on the retrieved profile (e.g., a profile retrieved via communications network 614 from voice control data source 618) whether the profile comprises data of a speaking cadence for the user. If control circuitry 504 determines that the profile comprises data of a speaking cadence for the user, control circuitry 504 retrieves from the profile of the user, the speaking cadence and utilizes the cadence to determine whether the user is speaking a command (e.g., in speech 112 or speech 116) for another user or for a voice assistant (e.g., voice assistant 102 or voice activated device 106) at 904. If control circuitry 504 determines, based on the retrieved profile, that there is not a stored speaking cadence for the user, control circuitry 504 proceeds to 906 where control circuitry 504 begins to train a speaking cadence for the user.

At 906, control circuitry 504 prompts the user to recite a sequence of utterances, for example, control circuitry 504 may prompt, by generating an audio signal via speakers 108 and 514 or on display 512, the user 110 or user 114 to recite a sequence utterances as if the user was prompting a voice activated device.

At 908, control circuitry 504 receives a second voice input from the user comprising the sequence of utterances. For example, control circuitry 504 may receive via microphone 104 the sequence of utterances that were prompted to the user.

At 910, control circuitry 504 determines an average amount of time between each utterance of the sequence of utterances. For example, control circuitry 504 may analyze the input received via microphone 104 and may determine, based on the received spoken input (e.g., speech 112 or 116), a period between words of the audio signal as discussed above.

At 912, control circuitry 504 determines the speaking cadence for the user based on the average amount of time between each utterance. For example, control circuitry 504 may determine the amount of time between words of the utterances as discussed above. Control circuitry 504 may add the amount of time between the words and may divide by the number of words to determine an average amount of time that the user pauses. At 914, control circuitry 504 may update the profile of the user to include a cadence determined based on the average amount of time between each utterance.

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 1-2 and 4-6 could be used to implement one or more portions of the process.

Figure 10:
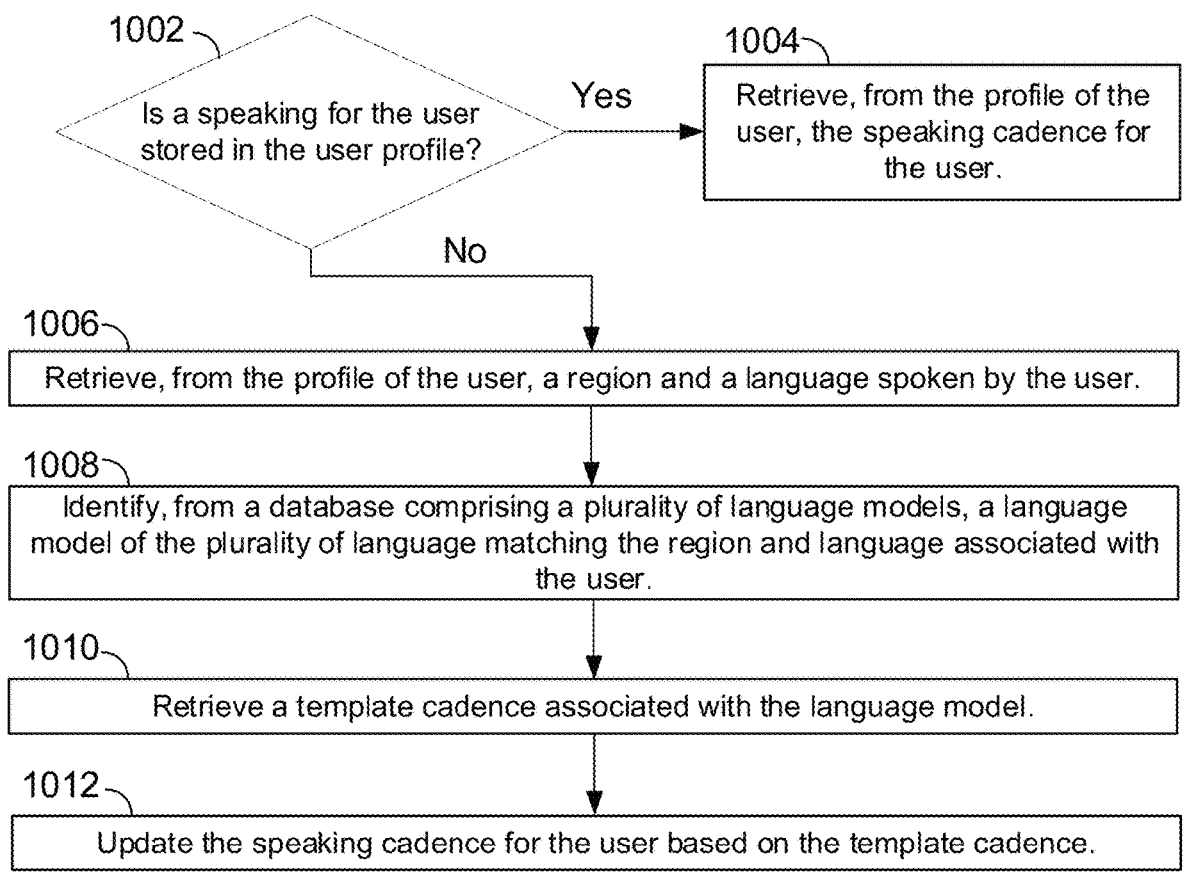
FIG. 10 depicts an illustrative process for updating a speaking cadence for a user based on regional and language settings, in accordance with some embodiments of this disclosure.

FIG. 10 is a flowchart of illustrative steps for updating a speaking cadence for a user based on regional and language settings, in accordance with some embodiments of the disclosure. For example, a voice control application implementing process 1000 may be executed by control circuitry 504. In some embodiments, instructions for executing process 1000 may be encoded onto a non-transitory storage medium (e.g., storage 508) as a set of instructions to be decoded and executed by processing circuitry (e.g., processing circuitry 506). Processing circuitry may, in turn, provide instructions to other sub-circuits contained within control circuitry 504, such as the tuning, video generating, encoding, decoding, encrypting, decrypting, scaling, analog/digital conversion circuitry, and the like. It should be noted that process 1000, or any step thereof, could be performed on, or provided by, any of the devices shown in FIGS. 1-2 and 4-6.

Process 1000 begins at 1002 where control circuitry 504 determines whether there is a speaking cadence for the user stored in the profile. For example, control circuitry 504 may identify one of user 110 or user 114 and may retrieve a profile for one of the users. Control circuitry 504 may determine, based on the retrieved profile (e.g., a profile retrieved via communications network 614 from voice control data source 618) whether the profile comprises data of a speaking cadence for the user. If control circuitry 504 determines that the profile comprises data of a speaking cadence for the user, control circuitry 504 retrieves from the profile of the user, the speaking cadence and utilizes the cadence to determine whether the user is speaking a command (e.g., in speech 112 or speech 116) for another user or for a voice assistant (e.g., voice assistant 102 or voice activated device 106) at 1004. If control circuitry 504 determines, based on the retrieved profile, that there is not stored speaking cadence for the user, control circuitry 504 proceeds to 1006 where control circuitry 504 retrieves a default speaking cadence for the user based on regional and language settings.

At 1006, control circuitry 504 retrieves, from the profile of the user, a region and a language spoken by the user. For example, control circuitry 504 may determine that the user is from the United States and speaks English based on tracking a location of the user's devices and based on recording audio of the user (e.g., speech 112 or speech 116) via microphone 104 and determining that the user is speaking English.

At 1008 control circuitry 504 identifies, from a database comprising a plurality of language models, a language model of the plurality of language models matching the region and language associated with the user. For example, control circuitry 504 may transmit to a database located on voice control data source 618 the region and language and may determine, based on the region and language a template cadence (e.g., a cadence typical for profiles having a same region and language). At 1010, control circuitry 504 retrieves a template cadence associated with the language model in response to the transmitting.

At 1012, control circuitry 504 updates the cadence for the user based on the template cadence. For example, control circuitry 504 may update a location in storage 508 to include the template cadence such that it may be accessed by control circuitry 504 to determine whether speech 112 or speech 116 is intended, by the user, to activate the voice assistant (e.g., voice assistant 102 or voice activated device 106).

It is contemplated that the steps or descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 4-5 could be used to implement one or more portions of the process.

FIG. 11 is a flowchart of illustrative steps for updating a speaking cadence for the user, in accordance with some embodiments of the disclosure. For example, a voice control application implementing process 1100 may be executed by control circuitry 504. In some embodiments, instructions for executing process 1100 may be encoded onto a non-transitory storage medium (e.g., storage 508) as a set of instructions to be decoded and executed by processing circuitry (e.g., processing circuitry 506). Processing circuitry may, in turn, provide instructions to other sub-circuits contained within control circuitry 504, such as the tuning, video generating, encoding, decoding, encrypting, decrypting, scaling, analog/digital conversion circuitry, and the like. It should be noted that process 1100, or any step thereof, could be performed on, or provided by, any of the devices shown in FIGS. 1-2 and 4-6.

Process 1100 begins at 1102, where control circuitry 504 compares the first plurality of utterances to the second plurality of utterances associated with an API of the voice capable device to determine whether an utterance of the first plurality of utterances matches an utterance of the second plurality of utterances. For example, control circuitry 504 may receive the first plurality of utterances via microphone 104 and may analyze the first plurality of utterances to determine whether an utterance matches a keyword associated with the API. (e.g., by transcribing the utterances to text and comparing the text to a textual keyword associated with the API.

At 1104 control circuitry 504 determines whether the utterance of the first plurality of utterances match the utterance of the second plurality of utterances. For example, control circuitry 504 may compare the text of the received utterances to an utterance associated with the API. When control circuitry 504 determines that a spoken utterance matches an utterance associated with the API, control circuitry 504 proceeds to 1106 where control circuitry 504 triggers performance of a function associated with the utterance of the second plurality of utterances by the voice capable user device (e.g., voice assistant 102 or voice activated device 106). When control circuitry 504 determines that a spoken utterance does not match an utterance associated with the API, control circuitry 504 proceeds to 1108 where control circuitry 504 determines whether it was correct in activating the voice assistant.

At 1108, control circuitry 504 prompts the user to confirm triggering of the voice capable user device. For example, control circuitry 504 may generate an audio prompt via speakers 108 and 514 or a visual prompt via display 512 asking the user to confirm whether the voice assistant should have been triggered by control circuitry 504.

At 1110 control circuitry 504 receives a second voice input from the user in response to the prompting. For example, control circuitry 504 may receive a second voice input via microphone 104 in response to the prompting.

At 1112 control circuitry 504 determines that the second voice input does not confirm the triggering of the voice capable user device. For example, control circuitry 504 may determine that the voice input rejects triggering of the voice assistant based on converting the second voice input to text and analyzing the words associated with the converted text.

At 1114, control circuitry 504 determines a cadence associated with the first voice input and the second voice input. For example, control circuitry 504 may determine the cadence as discussed above by analyzing the audio signal associated with both voice inputs and determining an average amount of time that the user pauses between words of the voice input.

At 1116, control circuitry 504 updates the speaking cadence for the user based on the cadence associated with the first voice input and the second voice input. For example, control circuitry 504 may retrieve a profile of the user and may update the profile to include the speaking cadence determined in step 1114, to refine the ability of control circuitry 504 to detect when the user wishes to trigger the voice assistant based on the user's speaking cadence.

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 1-2 and 4-6 could be used to implement one or more portions of the process.

FIG. 12 is a flowchart of illustrative steps for authenticating a user, in accordance with some embodiments of the disclosure. For example, a voice control application implementing process 1200 may be executed by control circuitry 504. In some embodiments, instructions for executing process 1200 may be encoded onto a non-transitory storage medium (e.g., storage 508) as a set of instructions to be decoded and executed by processing circuitry (e.g., processing circuitry 506). Processing circuitry may, in turn, provide instructions to other sub-circuits contained within control circuitry 504, such as the tuning, video generating, encoding, decoding, encrypting, decrypting, scaling, analog/digital conversion circuitry, and the like. It should be noted that process 1200, or any step thereof, could be performed on, or provided by, any of the devices shown in FIGS. 1-2 and 4-6.

Process 1200 begins at 1202 where control circuitry 504 generates a biometric fingerprint uniquely identifying the voice of the user. For example, control circuitry 504 may identify the unique characteristics of a voice input from the user, and based on the unique characteristics, generate a fingerprint that uniquely stores those unique traits and characteristics of the user's voice.

At 1204, control circuitry 504 compares the generated biometric fingerprint to a plurality of biometric fingerprints stored in a database, wherein each biometric fingerprint in the database is associated with a unique user profile. For example, control circuitry 504 may transmit the biometric fingerprint to voice control data source 618 via communications network 614 to a database of biometric voice fingerprints.

At 1206, control circuitry 504 determines, based on comparing, that the generated biometric fingerprint matches a biometric fingerprint, of the plurality of biometric fingerprints, that corresponds to the profile of the user. For example, control circuitry 504 may compare (e.g., based on the transmitting) the fingerprint generated based on speech 112 or speech 116 to a database listing a plurality of fingerprints and may determine, based on the comparison that speech 112 corresponds to a profile for user 110 and that speech 116 corresponds to a profile for user 114.

At 1208, control circuitry 504 retrieves a voice model indicative of a voice signature corresponding to the user from the profile of the user. For example, as discussed above, control circuitry 504 may identify the user in step

1206. Control circuitry 504 may retrieve a profile for the identified user (e.g., user 110 and user 114) comprising a voice model for the user.

At 1210, control circuitry 504 generates a fingerprint for the first utterance based on the voice model associated with the user. For example, control circuitry 504 may utilize the voice model to assist control circuitry 504 in determining how features of the received audio map to text.

At 1212, control circuitry 504 compares the fingerprint for the first utterance to a fingerprint associated with the keyword. For example, control circuitry 504 may compare the text generated for the utterance at 1210 with the text of the keyword to determine whether there is a match.

It is contemplated that the steps or descriptions of FIG. 12 may be used with any other embodiment of this disclosure. In addition, the descriptions described in relation to the algorithm of FIG. 12 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 12 may be implemented on a combination of appropriately configured software and hardware, and that any of the devices or equipment discussed in relation to FIGS. 1-2 and 4-6 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for avoiding inadvertent triggering of a voice capable device, the method comprising:
    detecting a voice input comprising a trigger word; and
    in response to detecting the voice input comprising the trigger word:
        determining a cadence of the voice input;
        identifying a user associated with the voice input;
        retrieving, from a profile of the user, a speaking cadence of the user;
        determining whether a difference between the cadence of the voice input and the speaking cadence of the user is less than a threshold value;
        in response to determining that the difference is less than the threshold value, refraining from triggering the voice capable device; and
        in response to determining that the difference is not less than the threshold value, triggering the voice capable device.

2. The method of claim 1, wherein the voice input is a first voice input, further comprising:
    prompting the user to recite a sequence of utterances prior to detecting the voice input comprising the trigger word;
    in response to prompting the user, receiving a second voice input from the user comprising the sequence of utterances;
    in response to receiving the sequence of utterances, determining the speaking cadence of the user based on an amount of time between each utterance of the sequence of utterances; and
    storing, in the profile of the user, the speaking cadence of the user.

3. The method of claim 1, further comprising:
    retrieving, from the profile of the user, demographic information corresponding to the user;
    identifying, based on the demographic information corresponding to the user, a template speaking cadence; and
    storing, in the profile of the user, the template speaking cadence as the speaking cadence of the user.

4. The method of claim 1, wherein the voice input comprises a sequence of a plurality of words, further comprising:
    determining a position of the trigger word in the sequence of the plurality of words; and
    refraining from triggering the voice capable user device when the position of the trigger word is greater than a threshold maximum position.

5. The method of claim 4, further comprising:
    determining an average position of the trigger word based on a plurality of voice inputs from the user activating the voice capable device; and
    determining the threshold maximum position based on the average position of the trigger word.

6. The method of claim 1, wherein triggering the voice capable device comprises:
    determining whether a portion of the voice input matches a word associated with a voice capable device function; and
    in response to determining that the portion of the voice input matches the word associated with the voice capable device function, performing the voice capable device function.

7. The method of claim 5, further comprising terminating the triggering of the voice capable device in response to determining that the portion of the voice input does not match the word associated with the voice capable device function.

8. The method of claim 1, wherein identifying the user associated with the voice input, comprises:
    identifying a plurality of features associated with the voice input;
    comparing the plurality of features associated with the voice input to a voice fingerprint uniquely identifying features of the voice of the user; and
    selecting the user in response to determining that at least a threshold number of the plurality of features associated with the voice input match the voice fingerprint uniquely identifying features of the voice of the user.

9. The method of claim 1, further comprising triggering the voice capable device in response to determining that the difference is not less than the threshold value.

10. The method of claim 1, further comprising detecting the trigger word based on a fingerprint associated with the trigger word.

11. A system for avoiding inadvertent triggering of a voice capable device, the system comprising control circuitry configured to:
   detect a voice input comprising a trigger word; and
   in response to detecting the voice input comprising the trigger word:
      determine a cadence of the voice input;
      identify a user associated with the voice input;
      retrieve, from a profile of the user, a speaking cadence of the user;
      determine whether a difference between the cadence of the voice input and the speaking cadence of the user is less than a threshold value;
      in response to determining that the difference is less than the threshold value, refrain from triggering the voice capable device; and
      in response to determining that the difference is not less than the threshold value, trigger the voice capable device.

12. The system of claim 11, wherein the voice input is a first voice input, and wherein the control circuitry is further configured to:
   prompt the user to recite a sequence of utterances prior to detecting the voice input comprising the trigger word;
   in response to prompting the user, receive a second voice input from the user comprising the sequence of utterances;
   in response to receiving the sequence of utterances, determine the speaking cadence of the user based on an amount of time between each utterance of the sequence of utterances; and
   store, in the profile of the user, the speaking cadence of the user.

13. The system of claim 11, wherein the control circuitry is further configured to:
   retrieve, from the profile of the user, demographic information corresponding to the user;
   identify, based on the demographic information corresponding to the user, a template speaking cadence; and
   store, in the profile of the user, the template speaking cadence as the speaking cadence of the user.

14. The system of claim 11, wherein the voice input comprises a sequence of a plurality of words, and wherein the control circuitry is further configured to:
   determine a position of the trigger word in the sequence of the plurality of words; and
   refrain from triggering the voice capable user device when the position of the trigger word is greater than a threshold maximum position.

15. The system of claim 14, wherein the control circuitry is further configured to:
   determine an average position of the trigger word based on a plurality of voice inputs from the user activating the voice capable device; and
   determine the threshold maximum position based on the average position of the trigger word.

16. The system of claim 11, wherein the control circuitry is further configured, when triggering the voice capable device, to:
   determine whether a portion of the voice input matches a word associated with a voice capable device function; and
   in response to determining that the portion of the voice input matches the word associated with the voice capable device function, perform the voice capable device function.

17. The system of claim 15, wherein the control circuitry is further configured to terminate the triggering of the voice capable device in response to determining that the portion of the voice input does not match the word associated with the voice capable device function.

18. The system of claim 11, wherein the control circuitry is further configured, when identifying the user associated with the voice input, to:
   identify a plurality of features associated with the voice input;
   compare the plurality of features associated with the voice input to a voice fingerprint uniquely identify features of the voice of the user; and
   select the user in response to determining that at least a threshold number of the plurality of features associated with the voice input match the voice fingerprint uniquely identifying features of the voice of the user.

19. The system of claim 11, wherein the control circuitry is further configured to trigger the voice capable device in response to determining that the difference is not less than the threshold value.

20. The system of claim 11, wherein the control circuitry is further configured to detect the trigger word based on a fingerprint associated with the trigger word.

* * * * *